(12) United States Patent
Osaki et al.

(10) Patent No.: US 10,560,452 B2
(45) Date of Patent: Feb. 11, 2020

(54) APPARATUS AND METHOD TO CONTROL TRANSFER APPARATUSES DEPENDING ON A TYPE OF AN UNAUTHORIZED COMMUNICATION OCCURRING IN A NETWORK

(71) Applicant: FUJITSU LIMITED, Kawasaki-shi, Kanagawa (JP)

(72) Inventors: Hiroyasu Osaki, Yokkaichi (JP); Takahiro Shimazaki, Kawasaki (JP); Hidehiko Mayumi, Kawasaki (JP); Shu Matsuoka, Shibuya (JP); Takashi Okamura, Yokohama (JP); Mitsuru Okajima, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 15/421,703

(22) Filed: Feb. 1, 2017

(65) Prior Publication Data

US 2017/0237733 A1 Aug. 17, 2017

(30) Foreign Application Priority Data

Feb. 16, 2016 (JP) .................................. 2016-027369

(51) Int. Cl.
*H04L 29/06* (2006.01)
*H04L 12/58* (2006.01)

(52) U.S. Cl.
CPC .......... *H04L 63/0876* (2013.01); *H04L 51/24* (2013.01); *H04L 63/10* (2013.01)

(58) Field of Classification Search
None
See application file for complete search history.

(56) References Cited

U.S. PATENT DOCUMENTS 7,891,001 B1 * 2/2011 Greenawalt ............. H04L 63/20
    713/151
8,291,495 B1 * 10/2012 Burns ................. H04L 63/0254
    726/23

(Continued)

FOREIGN PATENT DOCUMENTS

JP    2005-276042 A    10/2005
JP    2006-033140 A    2/2006

(Continued)

OTHER PUBLICATIONS

Office Action dated Aug. 20, 2019, issued in counterpart JP application No. 2016-027369, with English translation. (11 pages).

*Primary Examiner* — Jason Chiang
(74) *Attorney, Agent, or Firm* — Westerman, Hattori, Daniels & Adrian, LLP; John P. Kong

(57) ABSTRACT

An apparatus controls transfer apparatuses that transfer a packet transmitted and received by terminals in a network. Upon receiving detection information notified from a server that detects unauthorized communication of a terminal by using the packet, the apparatus identifies the terminal and a type of the unauthorized communication, based on the detection information. The apparatus determines a transfer apparatus to be controlled, by referencing first information that stores information identifying the transfer apparatus in association with the terminal, and determines a control to be performed on the transfer apparatus by referencing second information that stores information on the control in association with the type of the unauthorized communication. The apparatus reads a control command corresponding to the control from third information that stores the control command in association with a type of the transfer apparatus, and transmits a control packet including the control command to the transfer apparatus.

8 Claims, 23 Drawing Sheets

(56) References Cited

U.S. PATENT DOCUMENTS

| | | | | |
|---|---|---|---|---|
| 2002/0194489 A1* | 12/2002 | Almogy | ................ | G06F 21/554 726/24 |
| 2003/0145228 A1* | 7/2003 | Suuronen | ............ | H04L 63/0227 726/12 |
| 2005/0193429 A1* | 9/2005 | Demopoulos | ......... | G06F 21/552 726/23 |
| 2007/0153696 A1* | 7/2007 | Choyi | ................. | H04L 63/0218 370/235 |
| 2007/0159979 A1* | 7/2007 | Butler | ..................... | H04L 12/14 370/244 |
| 2014/0123279 A1* | 5/2014 | Bishop | ................ | H04L 63/1491 726/23 |
| 2015/0071298 A1* | 3/2015 | Combs | .................... | H04L 45/44 370/409 |
| 2015/0200956 A1 | 7/2015 | Koide et al. | | |
| 2016/0050227 A1* | 2/2016 | Desai | .................... | H04L 63/104 726/3 |
| 2016/0315866 A1* | 10/2016 | Thapar | ................ | H04L 47/2408 |

FOREIGN PATENT DOCUMENTS

| | | |
|---|---|---|
| JP | 2008-083751 A | 4/2008 |
| JP | 2015-050717 A | 3/2015 |
| JP | 2015-530678 A | 10/2015 |
| WO | 2015/107861 A1 | 7/2015 |

* cited by examiner

FIG. 20

| ITEM NO. | ITEM | DATA |
|---|---|---|
| | 76a | |
| 1 | PROCESSING TARGET LIST | — |
| 1-1 | PROCESSING TARGET DEVICE | APPARATUS TABLE 53a |
| 1-2 | SETTING CONFIG | COMMAND INFORMATION 55a |
| 1-3 | EXECUTION ORDER | 1 |

| ITEM NO. | ITEM | DATA |
|---|---|---|
| | 53a | |
| 1 | DEVICE TYPE | Catalyst3560x |
| 2 | COMMUNICATION TYPE | TELNET |
| 3 | CONNECTION DESTINATION IP ADDRESS | 192.168.0.1 |
| 4 | CONNECTION DESTINATION URL | — |
| 5 | WAITING USER NAME | Login: |
| 6 | USER NAME | admin |
| 7 | PASSWORD WAITING | Password: |
| 8 | PASSWORD | fnets |
| 9 | MANAGEMENT MODE COMMAND | — |
| 10 | MANAGING USER NAME WAITING | — |
| 11 | MANAGING USER NAME | — |
| 12 | MANAGEMENT PASSWORD WAITING | — |
| 13 | MANAGEMENT PASSWORD | — |
| 14 | MANAGEMENT MODE END COMMAND | — |
| 15 | CONFIG MODE COMMAND | configure |
| 16 | CONFIG USER NAME WAITING | User |
| 17 | CONFIG USER NAME | con |
| 18 | CONFIG PASSWORD WAITING | Password: |
| 19 | CONFIG PASSWORD | asdf4321 |
| 20 | CONFIG MODE END COMMAND | exit |
| 21 | SETTING SAVE COMMAND | save , commit |

FIG. 21

| ITEM NO. | ITEM | DATA |
|---|---|---|
| 1 | COMMAND LIST | Catalyst3560x |
| 1-1 | EXECUTION ORDER | 1 |
| 1-2 | EXECUTION AUTHORITY | CONFIG |
| 1-3 | EXECUTION COMMAND | COMMAND C01 |
| 1-4 | TYPE | BASE |

55a

| COMMAND LIST | EXECUTION SEQUENCE | EXECUTION AUTHORITY | EXECUTION COMMAND | TYPE |
|---|---|---|---|---|
| Catalyst3560x | 1 | CONFIG | (config)# access-list 101 deny icmp 172.16.0.0 0.0.0.127 any echo | 1:BASE |
| Catalyst3560x | 2 | CONFIG | (config)# access-list 101 deny tcp 172.16.0.0 0.0.0.127 any eq ssh | 1:BASE |
| Catalyst3560x | 3 | CONFIG | (config)# access-list 101 permit ip any any | 1:BASE |
| Catalyst3560x | 4 | CONFIG | (config)# access-list 101 deny ip any any | 1:BASE |
| Catalyst3560x | 5 | CONFIG | (config)# interface fa 0/1 | 1:BASE |
| Catalyst3560x | 6 | CONFIG | (config-if)# ip access-group 101 in | 1:BASE |

L1

| COMMAND LIST | EXECUTION SEQUENCE | EXECUTION AUTHORITY | EXECUTION COMMAND | TYPE |
|---|---|---|---|---|
| Catalyst3560x | 1 | CONFIG | access-list 102 permit ip %target_host 255.255.255.255 192.168.0.100 | 2:ACTION |
| Catalyst3560x | 2 | CONFIG | access-list 102 deny ip %target_host 255.255.255.255 any | 2:ACTION |

| COLUMN NAME | DATA |
|---|---|
| NOTIFICATION DESTINATION ID | 1 |
| NOTIFICATION DESTINATION NAME | QUARANTINE DETECTION NOTIFICATION DESTINATION |
| NOTIFICATION DESTINATION E-MAIL ADDRESS | info@example.com |

54

| COLUMN NAME | DATA |
|---|---|
| ISOLATION ID | 1 |
| HOST NAME | okamura-pc |
| IP ADDRESS | 192.168.0.1 |
| DETECTION DATA AND TIME | 2016/1/29 11:29:00 |
| POLICY ID | 1 |

| COMMUNICATION TERMINAL | TRANSFER APPARATUS |
|---|---|
| 192.168.1.1 (COMMUNICATION TERMINAL 10c) | 10.0.0.1 (SWITCH 3d) 10.0.0.2 (SWITCH 3e) |
| ... | ... |

T11

| UNAUTHORIZED COMMUNICATION TYPE | CONTROL |
|---|---|
| DETECTION OF VIRUS INFECTION | ISOLATION OF TARGET |
| DETECTION OF BACKDOOR COMMUNICATION | LIMIT TRANSFER SPEED OF PACKET CONTAINING IP ADDRESS OF TARGET TO VALUE LESS THAN OR EQUAL TO THRESHOLD |
| ... | ... |

T12

| TRANSFER APPARATUS | CONTROL | CONTROL |
|---|---|---|
| 10.0.0.1 (SWITCH 3d) | ISOLATION OF TARGET | COMMAND GROUP CG1 |
| | RELEASE OF ISOLATION FOR TARGET | COMMAND GROUP CG11 |
| | LIMIT TRANSFER SPEED OF PACKET CONTAINING IP ADDRESS OF TARGET TO VALUE LESS THAN OR EQUAL TO THRESHOLD | COMMAND GROUP CG15 |
| | ... | ... |
| 10.0.0.2 (SWITCH 3e) | ISOLATION OF TARGET | COMMAND GROUP CG2 |
| | ... | ... |
| ... | ... | ... |

T13

APPARATUS AND METHOD TO CONTROL TRANSFER APPARATUSES DEPENDING ON A TYPE OF AN UNAUTHORIZED COMMUNICATION OCCURRING IN A NETWORK

CROSS-REFERENCE TO RELATED APPLICATION

This application is based upon and claims the benefit of priority of the prior Japanese Patent Application No. 2016-027369, filed on Feb. 16, 2016, the entire contents of which are incorporated herein by reference.

FIELD

The embodiments discussed herein are related to apparatus and method to control transfer apparatuses depending on a type of an unauthorized communication occurring in a network.

BACKGROUND

In recent years, a targeted attack using malicious software (malware) is increasing. Accordingly, in order to reduce overlooking of malware infection or erroneous detection, a determination method is proposed (for example, International Publication Pamphlet No. 2015/107861). The method uses an evaluation value indicating the degree to which a terminal is assumed to be doing unauthorized activity in accordance with a result of comparison between communications by a terminal and patterns held in advance. In the determination method, an information processing apparatus obtains an evaluation value for each phase and uses the maximum value of the evaluation value for each phase to determine whether the terminal performs an unauthorized activity. A method that estimates whether data is associated with malware is also proposed (for example, Japanese National Publication of International Patent Application No. 2015-530678). In the method, data, of which safety is uncertain or which is uncertain whether the data is non-malicious software, is quarantined and results of a determination as to whether data is safe or non-malicious software before and after quarantine are compared. In this method, data that is not estimated as malware is released from quarantine.

In recent years, a virtual network using software or software defined networking (SDN) that is a technology used to create a virtual network is also attracting attention. In the SDN, a network topology or the like is configured by software. A control apparatus called a controller within a network monitors a communication status of apparatuses within the network and performs control according to a status of each apparatus.

SUMMARY

According to an aspect of the invention, an apparatus controls transfer apparatuses that transfer packets transmitted and received by a plurality of communication terminals in a communication network. The apparatus receives detection information notified from a detection server that detects unauthorized communication of a communication terminal by using the packets, and identifies the communication terminal and a type of the unauthorized communication, based on the detection information. The apparatus determines at least one transfer apparatus to be controlled, by referencing first information that stores information identifying the at least one transfer apparatus in association with the communication terminal, and determines a control to be performed on the at least one transfer apparatus by referencing second information that stores information on the control in association with the type of the unauthorized communication. The apparatus reads a control command corresponding to the control from third information that stores the control command in association with each type of the at least one transfer apparatus, and transmit a control packet including the control command to each of the at least one transfer apparatus.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 20 is a diagram illustrating an example of an execution table and an apparatus table, according to an embodiment;

FIG. 21 is a diagram illustrating an example of command information, according to an embodiment;

FIG. 22 is a diagram illustrating an example of a notification destination table and an isolation status table, according to an embodiment;

FIG. 24 is a diagram illustrating an example of modification to information stored by a control apparatus, according to an embodiment.

DESCRIPTION OF EMBODIMENTS

Various pieces of malware exist and new malware or malware subspecies successively appear and types of malware are explosively increasing. In a case where an apparatus infected with malware is detected in a system, measures are taken to restrain spread of infection. In the meantime, behaviors of malware frequently differ according to types of malware and also, it becomes difficult to take measures after malware infection is detected. When the system is complicated, for example, in a case where a large number of apparatuses are included in the system, measures after malware infection is detected become more complicated and it becomes difficult to quickly perform an adequate treatment. Further, a case occurs where an apparatus is infected before a definition pattern detecting malware is distributed and infection is unable to be detected. Therefore, importance of detecting unauthorized communication caused by malware is increasing. Treatments for coping with infection differ depending on operation contents of malware or an infected apparatus and advanced expert knowledge is desired for measures in a case where the unauthorized communication is detected.

It is desirable to dynamically control a network after detection of unauthorized communication by accumulating control contents with which a control apparatus controlling the network is able to cope.

Figure 1:
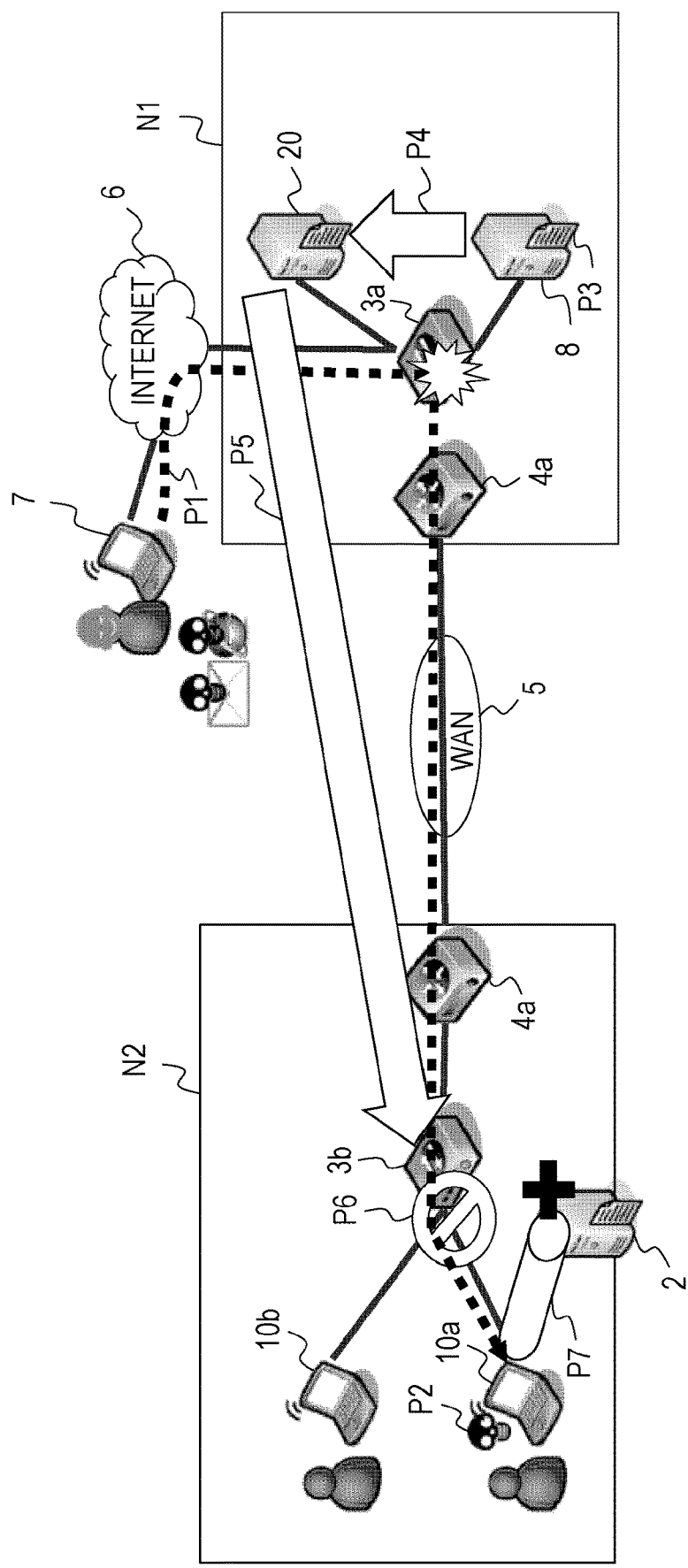
FIG. 1 is a diagram illustrating an example of a communication method, according to an embodiment.

FIG. 1 is a diagram illustrating an example of a communication method according to an embodiment. In a system illustrated in FIG. 1, a network N1 is coupled to a network N2 through a wide area network (WAN) 5 and the network N1 is coupled to the Internet 6. It is assumed that a command and control (C&C) server 7 attempts to access the network N1 or the network N2 through the Internet 6. In the network N1, a control apparatus 20, a detection server 8, a switch 3a, and a router 4a are included. In the network N2, a communication terminal 10a, a communication terminal 10b, a quarantine server 2, a switch 3b, and a router 4b are included. FIG. 1 is an example of a system and apparatuses in the networks N1 and N2 may be changed according to installation. For example, a communication terminal 10 other than the control apparatus 20 or the detection server 8 may be included in the network N1. The quarantine server 2 may not be included in the network N2. When the SDN is used for forming the networks N1 and N2, the control apparatus 20 is assumed to be operable as a SDN controller. In the following description, an apparatus, such as the switch 3 or the router 4, which transfers a packet transmitted from the communication terminal 10, is also denoted by a "transfer apparatus". When the SDN is used for forming the networks N1 and N2, respective transfer apparatuses operate as a SDN switch.

In Procedural sequence P1, it is assumed that a targeted attack, which targets a communication terminal 10a, is performed by the C&C server 7. In an example of FIG. 1, any type of the targeted attack is conceivable. For example, a targeted e-mail may be transmitted or information inducing a user of the communication terminal 10a to browse a specific website may be transmitted to the communication terminal 10a. Information used for a targeted attack is transferred to the communication terminal 10a through the Internet 6, the switch 3a, the router 4a, the router 4b, and the switch 3b. Thereafter, processing using information transmitted from the C&C server 7 is performed in the communication terminal 10a and thus it is assumed that the communication terminal 10a is infected with malware (Procedural sequence P2).

The detection server 8 monitors behaviors of the apparatuses in the system and specifies a communication terminal 10 for which unauthorized communication or the like is confirmed and a type of a detected event when unauthorized communication or infection by malware which causes unauthorized communication is detected in the system. It is assumed that the "unauthorized communication" includes transmission and reception of a file containing malware, or communication caused by execution of malware, or the like. For example, infection by malware such as a virus, communication to C&C server by backdoor, communication attempting to collect information within the network, and communication attempting to spread of infection to other apparatuses may be specified as the types of unauthorized communication by the detection server 8. In the example of FIG. 1, the detection server 8, for example, detects unauthorized communication in the communication terminal 10a using the packet transmitted and received within the system to determine that the communication terminal 10a is infected with malware (Procedural sequence P3). The detection server 8 notifies the control apparatus 20 of the communication terminal 10 for which unauthorized communication or the like is confirmed and a type of the detected event (Procedural sequence P4). The notification in Procedural sequence P4 may be performed in any forms including e-mail, a Trap notification of simple network management protocol (SNMP), a Syslog notification, or the like.

The control apparatus 20 specifies that the communication terminal 10a is infected with malware by using information notified from the detection server 8. Furthermore, the control apparatus 20 specifies a type of attack in accordance with a type of malware or the like.

For each communication terminal 10 included in the network N1 and the network N2, the control apparatus 20 stores information on a transfer apparatus which becomes a control target when the unauthorized communication is confirmed in the each communication terminal 10. Regarding each communication terminal 10, the switch 3 and the router 4 included in a communication path, through which the communication terminal 10 makes communication with another communication terminal 10 or the like, are correlated as a control target for a case where the each communication terminal 10 performs unauthorized communication. The control apparatus 20 stores information on control to be executed for each type of unauthorized communication likely to be detected. The control apparatus 20 determines a transfer apparatus which becomes the control target and contents of control for each transfer apparatus by using an analysis result notified from the detection server 8 and information stored in the control apparatus 20. For example, it is assumed that, an attack using a virus or the like is performed on the communication terminal 10*a*. It is assumed that the control apparatus 20 determines the switch 3*b* as the transfer apparatus of the control target by using information stored in the control apparatus 20, and also determines, as control contents, that the switch 3*b* is caused to perform processing for transferring a packet, for which the communication terminal 10*a* is set either as a transmission source or a destination, to the quarantine server 2.

In Procedural sequence P5, the control apparatus 20 transmits a control packet including control instructions for the transfer apparatus to each transfer apparatus determined as the control target. In the example of FIG. 1, the control apparatus 20 transmits to the switch 3*b* a control packet requesting the switch 3*b* to transfer the packet, for which the communication terminal 10*a* is set either as a transmission source or a destination, to the quarantine server 2.

In Procedural sequence P6, the switch 3*b* changes packet transfer processing in response to the request from the control apparatus 20. Accordingly, as illustrated in Procedural sequence P7, the packet used in communication of the communication terminal 10*a* is forcibly transferred to the quarantine server 2. Thus, it is possible to restrain a packet from the attacked communication terminal 10*a* from arriving at another communication terminal 10 within the system.

Description made with reference to FIG. 1 is merely an example of communication processing. For example, the control apparatus 20 may control the transfer apparatus such that a communication speed used for transmitting and receiving by the communication terminal 10, for which unauthorized communication is detected, is reduced according to the type of detected unauthorized communication. The control apparatus 20 may cause the transfer apparatus which becomes the control target to delete a packet according to data within the packet for which the communication terminal 10, for which unauthorized communication is detected, is set either as a transmission source or a destination. For example, the control apparatus 20 may cause the transfer apparatus which becomes the control target to discard a packet including a specified character string among the packets used for communicating with the communication terminal 10, for which unauthorized communication is detected. In this case, when a character string predicted to be used in description of personal information is set in a specific character string used when selecting a deleting target packet, it is possible to stop transmitting and receiving of personal information between the communication terminal 10, for which unauthorized communication is detected, and another communication terminal 10.

As such, according to a method of the embodiment, control in response to a type of attack or the like may be easily performed on the transfer apparatus within the network. Depending on malware used in an attack, there is, for example, a case where an analysis becomes difficult when an infected apparatus is physically isolated and measures against infection after infection by malware is detected become difficult. When the method according to the embodiment is used, appropriate processing in response to the type of unauthorized communication is autonomously performed by the control apparatus 20, for example, quarantine processing is started in the quarantine server 2 while the communication terminal 10 infected with malware by an attack is isolated. Accordingly, an operation and management of the system becomes easy. Measures against the communication terminal 10 infected with malware is changed in accordance with setting for the control apparatus 20 and thus, an action in response to the type of attack by malware is easily performed.

Apparatus Configuration

Figure 2:
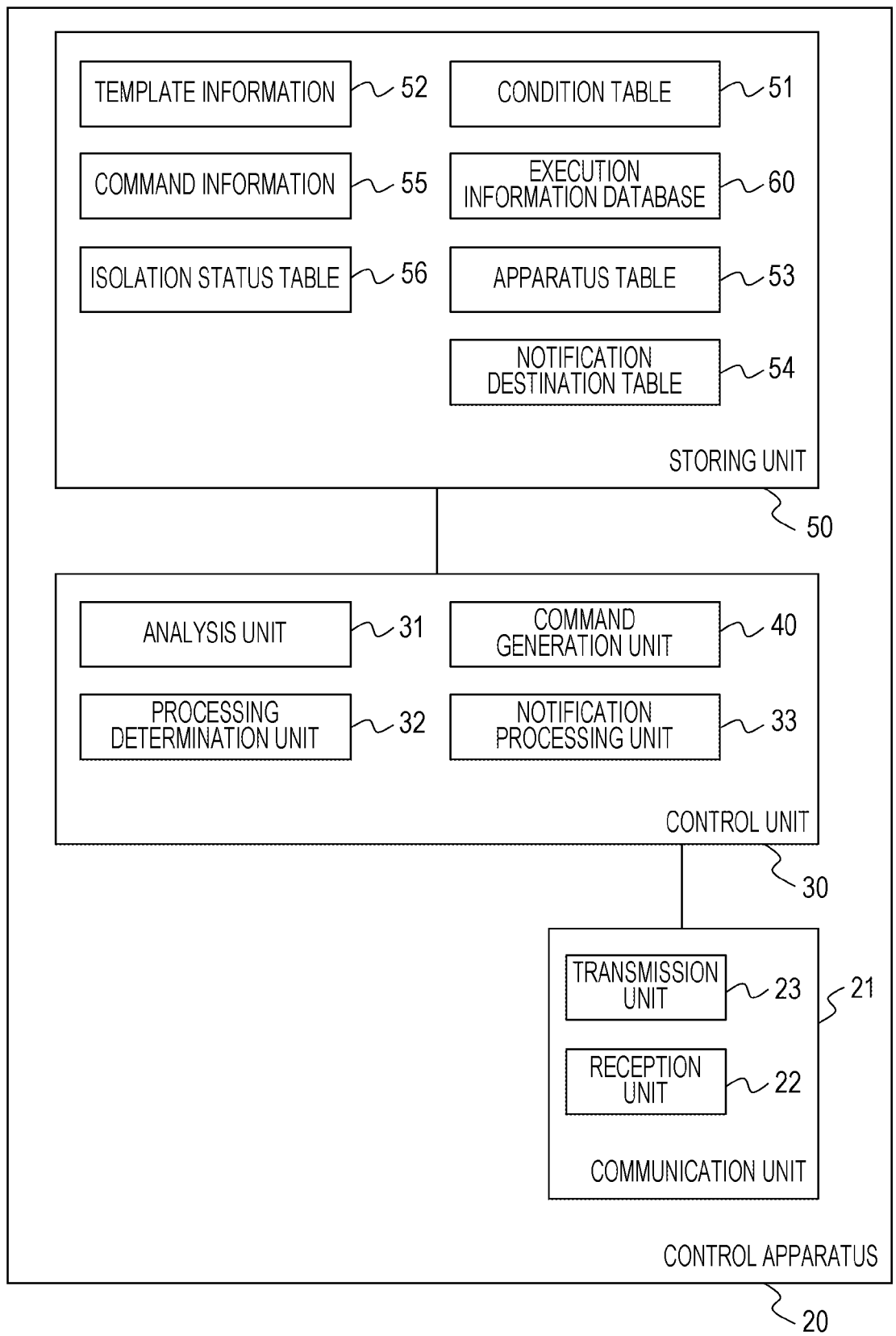
FIG. 2 is a diagram illustrating an example of a configuration of a control apparatus, according to an embodiment.

FIG. 2 is a diagram illustrating an example of a configuration of the control apparatus 20. The control apparatus 20 includes a communication unit 21, a control unit 30, and a storing unit 50. The communication unit 21 includes a reception unit 22 and a transmission unit 23. The control unit 30 includes an analysis unit 31, a processing determination unit 32, and a command generation unit 40, and includes a notification processing unit 33 as an option. A condition table 51, template information 52, an apparatus table 53, command information 55, an isolation status table 56, and an execution information database 60 are stored in the storing unit 50. In a case where the control apparatus 20 includes the notification processing unit 33, the notification destination table 54 is also stored in the storing unit 50.

The transmission unit 23 transmits a packet to another apparatus such as the switch 3 or the router 4. The reception unit 22 receives a packet from another apparatus such as a detection server 8. The reception unit 22 outputs the received packet to the analysis unit 31.

The analysis unit 31 analyzes an input packet by using the template information 52. The template information 52 includes information for specifying a communication terminal 10 which became a target of unauthorized communication and a type of unauthorized communication, for each type of notification transmitted from the detection server 8. An example of the template information 52 will be described later. The analysis unit 31 determines an execution table used for determining processing, by using information obtained by analysis and the condition table 51. The execution information database 60 includes a plurality of execution tables. The analysis unit 31 notifies information of the determined execution table and information of the communication terminal 10 which became a target of unauthorized communication to the processing determination unit 32. The processing determination unit 32 selects the notified execution table from the execution information database 60, and determines a transfer apparatus which becomes a control target and control contents by using the selected execution table. In a case where a communication terminal 10 infected with malware is isolated, the processing determination unit 32 records the determined contents in the isolation status table 56. The command generation unit 40 generates a control packet to be transmitted to each transfer apparatus of the control target, by using information determined by the processing determination unit 32 and by appropriately using the command information 55 or the apparatus table 53. In the apparatus table 53, information used in control of each apparatus within the system is recorded. Instructions used in control of the apparatus are recorded in the command information 55. The command generation unit 40 transmits the generated control packet to the transfer apparatus of the control target through the transmission unit 23.

In a case where a communication status of the communication terminal 10 within the network is changed by processing performed by the control apparatus 20, the notification processing unit 33 notifies information on the communication terminal 10 of which the communication status is changed and the changed communication status, to an apparatus to which an address recorded in the notification destination table 54 is allocated. For example, in a case where a communication terminal 10*a* is infected with a virus and thus the communication terminal 10*a* is isolated from other apparatuses within the network, the notification processing unit 33 notifies to a destination recorded in the notification destination table 54 that the communication terminal 10a is isolated. In the notification destination table 54, for example, information of an apparatus used by a system operator or the like is recorded.

Figure 3:
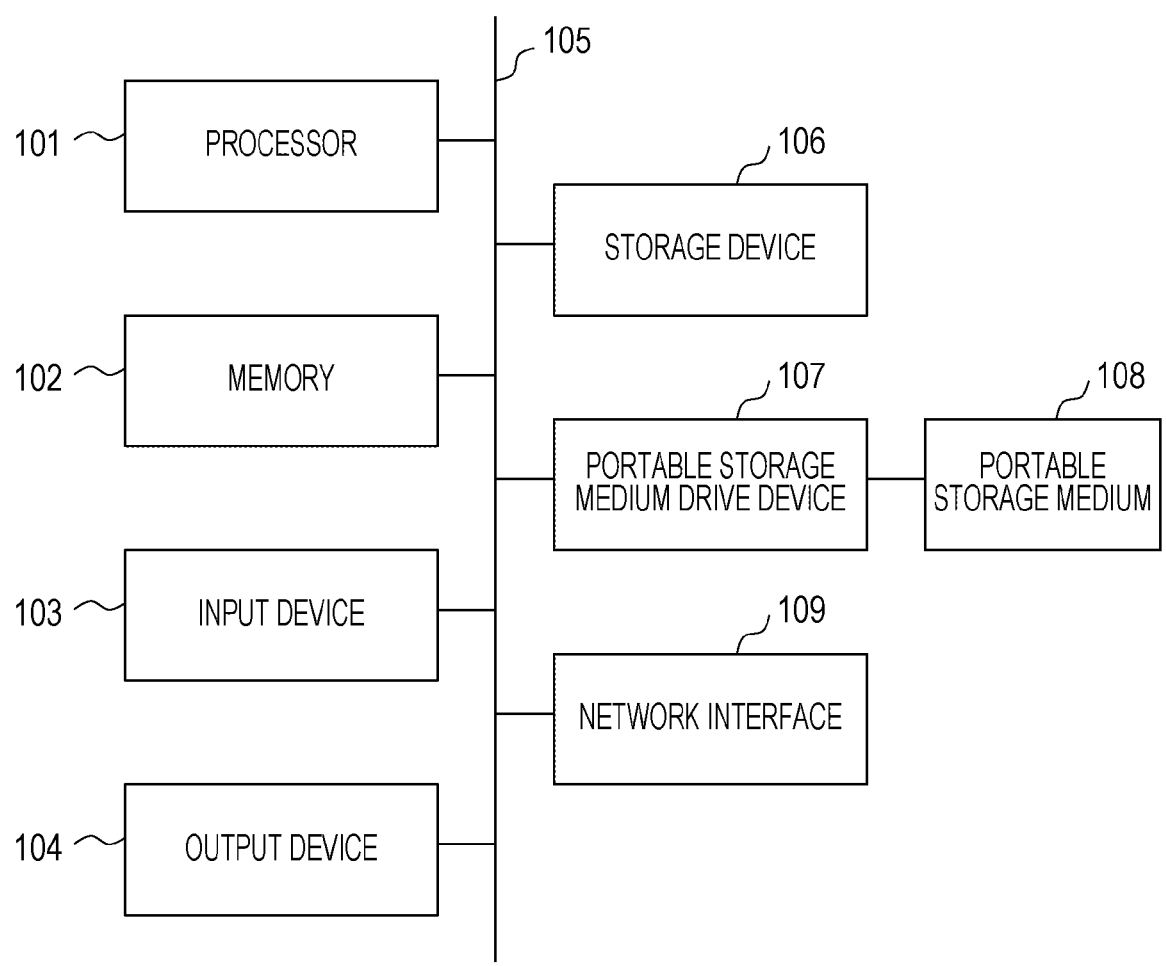
FIG. 3 is a diagram illustrating an example of a hardware configuration of a control apparatus, according to an embodiment.

FIG. 3 is a diagram illustrating an example of a configuration of hardware of the control apparatus 20. The control apparatus 20 includes a processor 101, a memory 102, an input device 103, an output device 104, a bus 105, and a network interface 109. The control apparatus 20 may further includes one or more of a storage device 106 and a portable storage medium drive device 107. The processor 101 is any processing circuit including a central processing unit (CPU) and may execute a program stored in the memory 102 or the storage device 106. The processor 101 implements a control unit 30. The memory 102 or the storage device 106 operates as the storing unit 50. The network interface 109 operates as the communication unit 21. The bus 105 couples the processor 101, the memory 102, the input device 103, the output device 104, the storage device 106, a portable storage medium drive device 107, and the network interface 109 so as to make it possible to transmit and receive data between each other.

The input device 103 is, for example, a keyboard or a mouse, and is any apparatus used for inputting information. The output device 104 is, for example, a display device including a display, and is any apparatus used for outputting data. The portable storage medium drive device 107 may output data of the memory 102 or the storage device 106 to the portable storage medium 108, and read a program, data, or the like from the portable storage medium 108. The portable storage medium 108 is, for example, a compact disc recordable (CD-R), a digital versatile disk recordable (DVD-R), or the like and may be used as any storage medium capable of being carried.

First Embodiment

Figure 4:
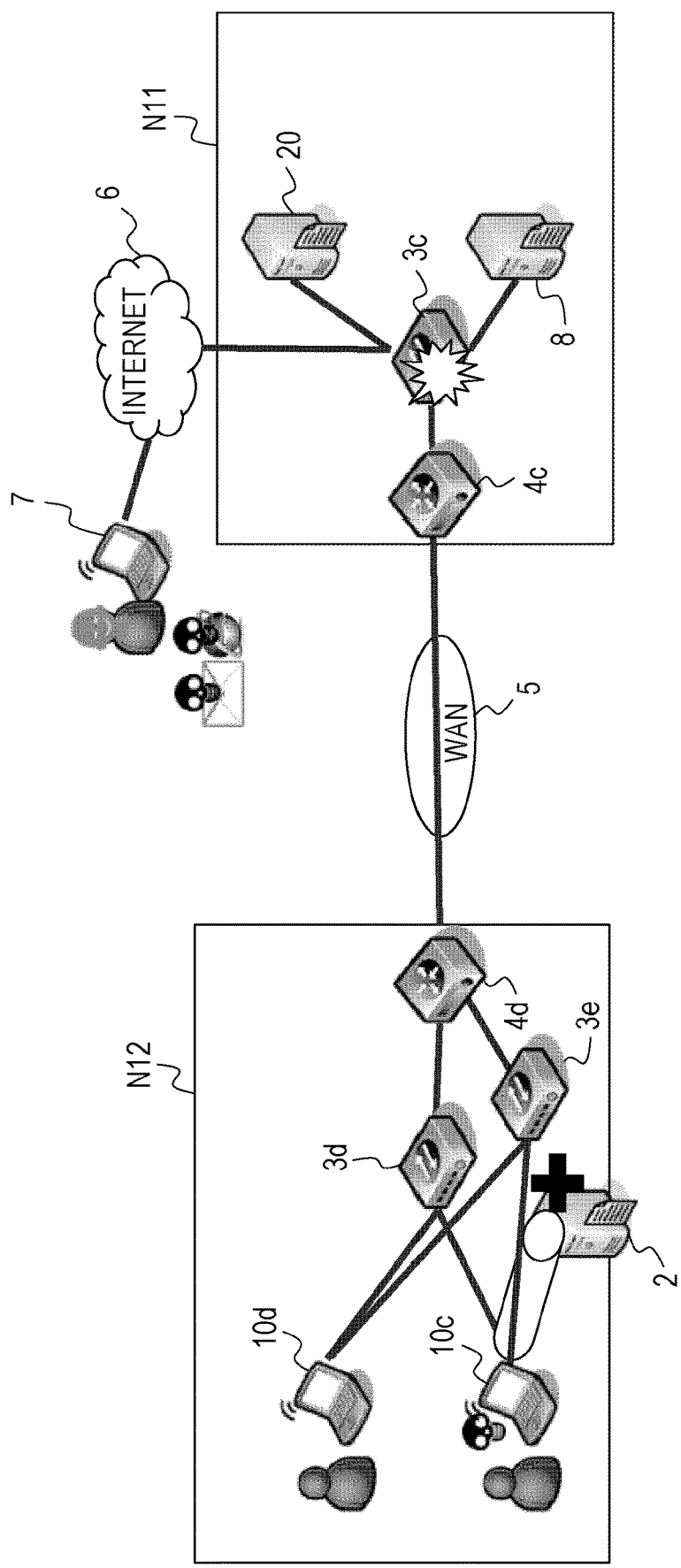
FIG. 4 is a diagram illustrating an example of a system, according to an embodiment.

FIG. 4 is a diagram illustrating an example of a system. In the system illustrated in FIG. 4, the network N11 is coupled to the network N12 through the WAN 5, and the network N11 is coupled to the Internet 6. It is assumed that the C&C server 7 attempts to access the network N11 or the network N12 through the Internet 6. In the network N11, the control apparatus 20, a detection server 8, a switch 3c, and a router 4c are included. On the other hand, in the network N12, a communication terminal 10c, a communication terminal 10d, a switch 3d, a switch 3e, a router 4d, and a quarantine server 2 are included. FIG. 4 illustrates an example of the system, and apparatuses within the networks N11 and N12 may be changed according to installation. In the following, details of processing performed in the control apparatus 20 will be described using a case where communication control according to the embodiment in the system of FIG. 4 is performed as an example. In the following description, it is assumed that both the switch 3d and the switch 3e are L3 switches, and an internet protocol (IP) address is allocated to both the switch 3d and the switch 3e.

Figure 5:
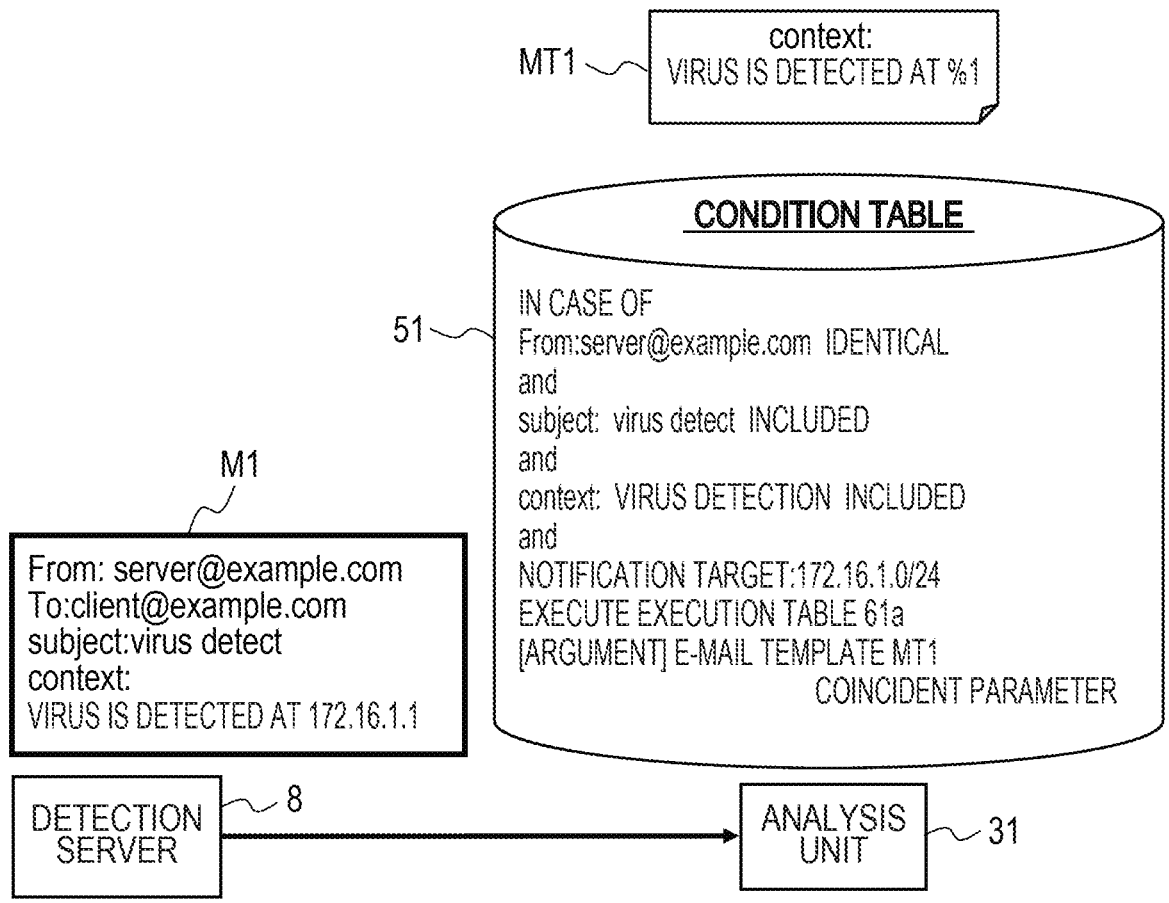
FIG. 5 is a diagram illustrating an example of analysis processing when a notification by e-mail is received, according to an embodiment.

FIG. 5 is a diagram illustrating an example of analysis processing of the control apparatus 20 when a notification by e-mail is received. It is assumed that the detection server 8 monitors behaviors of apparatuses within the network N11 and N12 to detect that the communication terminal 10c is infected with a virus. It is assumed that an address of the communication terminal 10c is 172.16.1.1. In FIG. 5, it is assumed that an e-mail address, which is used for a notification of detection of unauthorized communication by the detection server 8, is server@example.com, and an e-mail address used for reception of a notification by the control apparatus 20 is client@example.com. The detection server 8 transmits an e-mail M1 in FIG. 5 to the control apparatus 20.

When a reception e-mail is acquired by processing an input packet, the analysis unit 31 compares the reception e-mail with each condition within the condition table 51. In the condition table 51, information for selecting an execution table used for processing is recorded in association with a form of notification having the possibility of reception by the control apparatus 20. In FIG. 5, although an example of a single condition that may be applied to the notification by e-mail among the condition table 51 is extracted and illustrated in order to make easy to understand, any number of conditions is available within the condition table 51. In the example of FIG. 5, a combination of a transmission source of the e-mail, a character string within subject, a character string within context, and a notification target is included in the condition table 51. The analysis unit 31 specifies the type of unauthorized communication by using the combination of the transmission source of e-mail, the character string within subject, and the character string within context. The notification target corresponds to a range of addresses of the communication terminal 10 to which unauthorized communication is informed by the notification from the detection server 8. The notification target is correlated with an address, which is allocated to the communication terminal 10 for which unauthorized communication is detected in a case where a condition within the entries is applied.

For example, it is assumed that a transmission source address of the reception e-mail is server@example.com, a character string of "virus detect" is included in subject, and a character string of the "virus detection" is included context. In this case, the analysis unit 31 determines that one of the communication terminals corresponding to the range of addresses is infected with a virus.

Next, a virus infection is notified and thus, the analysis unit 31 selects a template used for an analysis of the e-mail notifying virus infection from the template information 52. In an example of FIG. 5, it is assumed that the analysis unit 31 selects an e-mail template MT1. The analysis unit 31 compares the reception e-mail and the e-mail template MT1. The e-mail template MT1 indicates that the character string corresponding to "%1" within the context of the reception e-mail is an address allocated to the communication terminal 10 infected with a virus in a case where description of context is set as the character string of "virus is detected at %1". In the example of FIG. 5, the analysis unit 31 compares the e-mail template MT1 and the e-mail M1 to determine that the communication terminal 10 (communication terminal 10c) to which an address of 172.16.1.1 is allocated is infected with a virus.

The analysis unit 31 retrieves a condition, that may be applied to a case where the communication terminal 10 whose IP address is 172.16.1.1 is infected, from the conditions, which are available in a case where an infection by virus is notified, within the condition table 51. In this case, the analysis unit 31 compares a value of the notification target associated with each of the conditions available when an infection by virus is detected, with the address of the communication terminal 10 for which an infection by virus is detected. In the entries within the condition table 51 illustrated in FIG. 5, the notification target is 172.16.1.0/24. That is, the condition table 51 indicates that the execution table 61a is usable in a case where infection by virus is detected in an apparatus to which an address whose first to third octets are the same as that of 172.16.1.0 is allocated. An IP address of the communication terminal 10c infected with a virus is 172.16.1.1 and thus, the analysis unit 31 determines that the execution table 61*a* is usable based on the condition table 51. The analysis unit 31 outputs matters that the execution table 61*a* is usable and that an address allocated to the communication terminal 10*c* infected with a virus is 172.16.1.1, to the processing determination unit 32.

Figure 6:
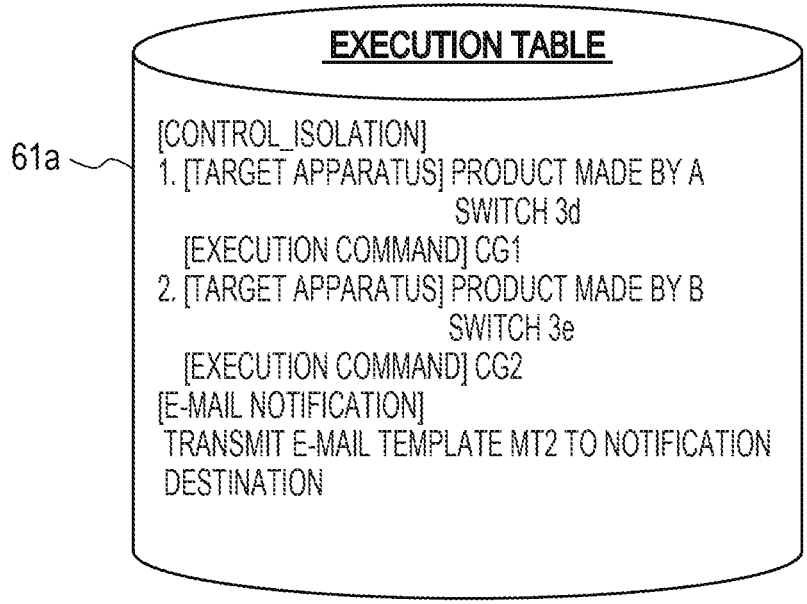
FIG. 6 is a diagram illustrating an example of an execution table, according to an embodiment.

FIG. 6 is a diagram illustrating an example of an execution table 61. FIG. 6 illustrates the execution table 61 including information used for isolation of the communication terminal 10 to which an address of IP address=172.16.1.0/24 is allocated. In the execution table 61, the contents of processing performed using the execution table 61 and the apparatus which becomes a target of a control are recorded. For example, in the execution table 61*a*, isolation of the communication terminal 10 for which infection is detected and e-mail notification processing for notifying an operator that isolation processing is performed are recorded as the contents of processing. In the execution table 61*a*, an apparatus which becomes a control target for isolating the communication terminal 10 and a command group executed for control of each apparatus of the control target are associated with information of each apparatus. The command group is included in the command information 55. In a case where the communication terminal 10 which became target for isolation is able to perform communication by using a redundant path, information of the apparatuses, of which isolation processing is performed in all paths capable of being used by the communication terminal 10 of the isolation target, is recorded in the execution table 61.

For example, in the network illustrated in FIG. 4, the communication terminal 10*c* which became an isolation target is able to communicate with another apparatus by using any of the switch 3*d* and the switch 3*e*. In an example of the execution table 61*a*, the switch 3*d* and the switch 3*e* within the network N2 are recorded as the control target for isolating the communication terminal 10*c*. It is assumed that the switch 3*d* is a product made by A company. It is assumed that commands of a command group CG1 are used for control of the switch 3*d*. Similarly, the switch 3*e* is a product made by B company, and commands applied to the switch 3*e* are commands of a command group CG2. A notification e-mail generated using an e-mail template MT2 is transmitted to each of notification destinations included in the notification destination table 54 and is recorded in the execution table 61*a*.

Control information within the execution table 61 may be changed according to installation. For example, processing, which couples the communication terminal 10, for which unauthorized communication is detected, to the quarantine server 2 through a virtual private network (VPN) may be recorded in the execution table 61. In the execution table 61, information of any type of the transfer apparatus such as the router 4 as well as the switch 3 may be included.

Isolation of the communication terminal 10 is set as the control contents in the execution table 61 notified from the analysis unit 31 and thus, the processing determination unit 32 records information of the communication terminal 10*c* of the isolation target in the isolation status table 56. For example, the processing determination unit 32 records an address of an apparatus of the isolation target in the isolation status table 56. In the isolation status table 56, an address of an apparatus of the isolation target and identification information such as an entry number, which specifies information within the execution table 61 used for isolation processing, may be recorded. For example, in a case where the execution table 61*a* of FIG. 6 is used, the following pieces of information are recorded in the isolation status table 56.

Address of apparatus of isolation target: 172.16.1.1 (communication terminal 10*c*)

Information used for isolation processing: execution table 61*a*

In the isolation status table 56, other pieces of information may be included according to installation.

When the apparatus which becomes the control target and the command group used for each apparatus of the control target are specified using the execution table 61 notified from the analysis unit 31, the processing determination unit 32 outputs the specified information to the command generation unit 40. In this case, it is assumed that the processing determination unit 32 also notifies an IP address of the communication terminal 10 for which unauthorized communication is detected, to the command generation unit 40. For example, in a case where the execution table 61*a* is used, the following pieces of information are notified to the command generation unit 40.

Address of apparatus for which unauthorized communication is detected: 172.16.1.1 (communication terminal 10*c*)

Control target 1: switch 3*d*

Command applied to control target 1: command group CG1

Control target 2: switch 3*e*

Command applied to control target 2: command group CG2

The command generation unit 40 performs processing by using information acquired from the processing determination unit 32, the apparatus table 53, and the command information 55.

Figure 7:
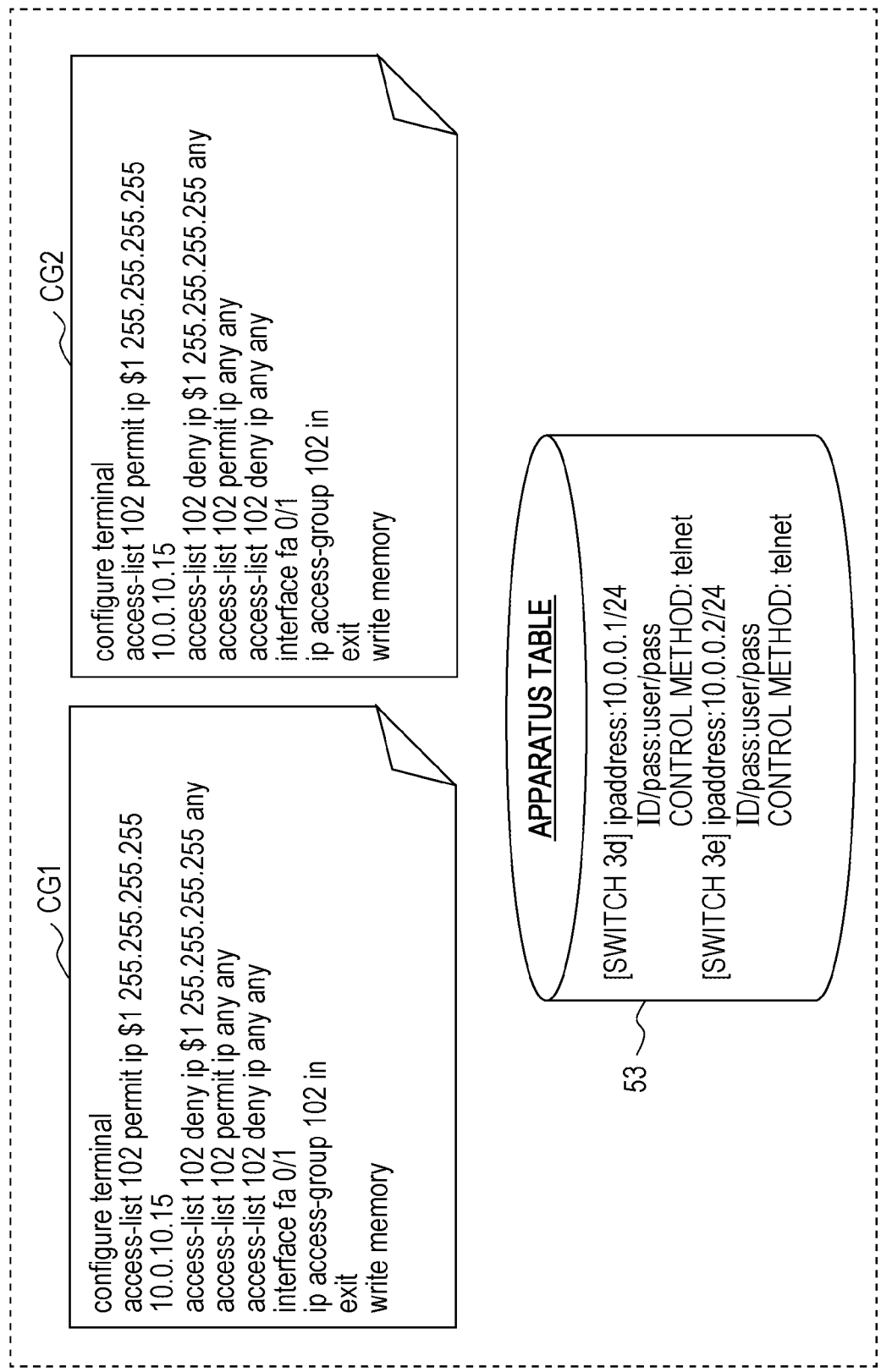
FIG. 7 is a diagram illustrating an example of an apparatus table and command information, according to an embodiment.

FIG. 7 is a diagram illustrating an example of the apparatus table 53 and the command information 55. In FIG. 7, information of commands included in a command group CG1 and a command group CG2 among the command information 55 are illustrated. In the following description, although a case where processing using an IP access control list (ACL) is performed is illustrated as an example, commands for any setting processing other than the IP ACL may be used in the command information 55 according to installation. In the following description, it is assumed that a different value, as a number of the ACL, is set for each processing implemented by control. In the following, a case in which filtering in the switch 3 or the router 4 within the system is performed under a condition of ACL number=101 in a state where an attack is not yet detected and filtering is performed under a condition of ACL number=102 when isolation of the communication terminal 10 is performed due to the detection of attack, is used as an example.

In the apparatus table 53, information used in a case where an apparatus within the system is controlled is recorded in association with identification information of the apparatus. In an example of FIG. 7, in association with the identification information of an apparatus, an IP address allocated to the apparatus, a protocol used when the apparatus is controlled, an ID of control, and a password are recorded. An IP address of 10.0.0.1 is allocated to the switch 3*d* and a subnet mask is 24 bits. Control using a telnet (Teletype network) is performed for the switch 3*d*. Also, an IP address of 10.0.0.2 is allocated to the switch 3*e* and matters that the subnet mask is 24 bits and telnet is used for control of the switch 3*e* are recorded in the apparatus table 53.

Four conditional statements for access control are included in the command group CG1. In the command group CG1, processing for isolation of the communication terminal 10*c* is described and thus, an expansion ACL number=120 is used. In the first conditional statement, $1 is set as an IP address of a transmission source of a packet of the control target. The $1 is information to be replaced with an IP address of the communication terminal 10 for which unauthorized communication is detected. A wild card mask is designated after the $1. In the following description, it is assumed that address information which is set in the packet of a processing target is specified using a value obtained by an AND operation between each bit of the wild card mask and each bit indicated in the $1. 10.0.10.15 is set as an IP address of a destination of the packet of the control target. In the following description, it is assumed that an IP address of 10.0.10.15 is allocated to the quarantine server 2. A command argument of the first conditional statement is permit which represents permission of the packet. Accordingly, the first conditional statement represents that a packet whose destination is the quarantine server 2, among the IP packets whose transmission source is the communication terminal 10 for which unauthorized communication is detected, is permitted. On the other hand, a command argument of the second conditional statement is set as deny which represents denial of the packet. Therefore, the second conditional statement represents that all of the IP packets whose transmission sources are the communication terminal 10 for which unauthorized communication is detected, are denied. In a case where the first conditional statement is applied, the second and succeeding conditional statements do not become a processing target and thus, a packet whose destination is an apparatus other than the quarantine server 2, among the IP packets whose transmission source is the communication terminal 10 for which unauthorized communication is detected, is denied by the second conditional statement. The third conditional statement represents that the packet is permitted for any of the transmission source and the destination. The fourth conditional statement represents that the packet is denied for any of the transmission source and the destination. Furthermore, the command group CG1 indicates that the conditional statements are applied to filtering for the packets arriving at interface Fa 0/1.

Four conditional statements for access control are also included in the command group CG2 and $1 is included as information to be replaced with an IP address of communication terminal 10 for which unauthorized communication is detected. Accordingly, the first conditional statement of the command group GC2 represents that a packet whose destination is set as an 10.0.10.15 (IP address of the quarantine server 2), among the IP packets whose transmission source is the communication terminal 10 for which unauthorized communication is detected, is permitted. On the other hand, the second conditional statement represents that all of the IP packets whose transmission source is the communication terminal 10 for which unauthorized communication is detected, are denied, and thus, a packet which is from the communication terminal 10 for which unauthorized communication is detected and whose destination is an apparatus other than the quarantine server 2, is denied by the second conditional statement. The third conditional statement represents that the packet is permitted for any of the transmission source and the destination. The fourth conditional statement represents that the packet is denied for any of the transmission source and the destination. Furthermore, the command group CG2 indicates that the conditional statements are applied to filtering for the packets arriving at interface Fa 0/1.

In the example of FIG. 7, although a case where the commands included in the command groups CG1 and CG2 are common is illustrated, the commands within a plurality of command groups executed when a single communication terminal 10 is isolated may be different or identical according to installation. Any number of conditional statements included in each command group is available.

Figure 8:
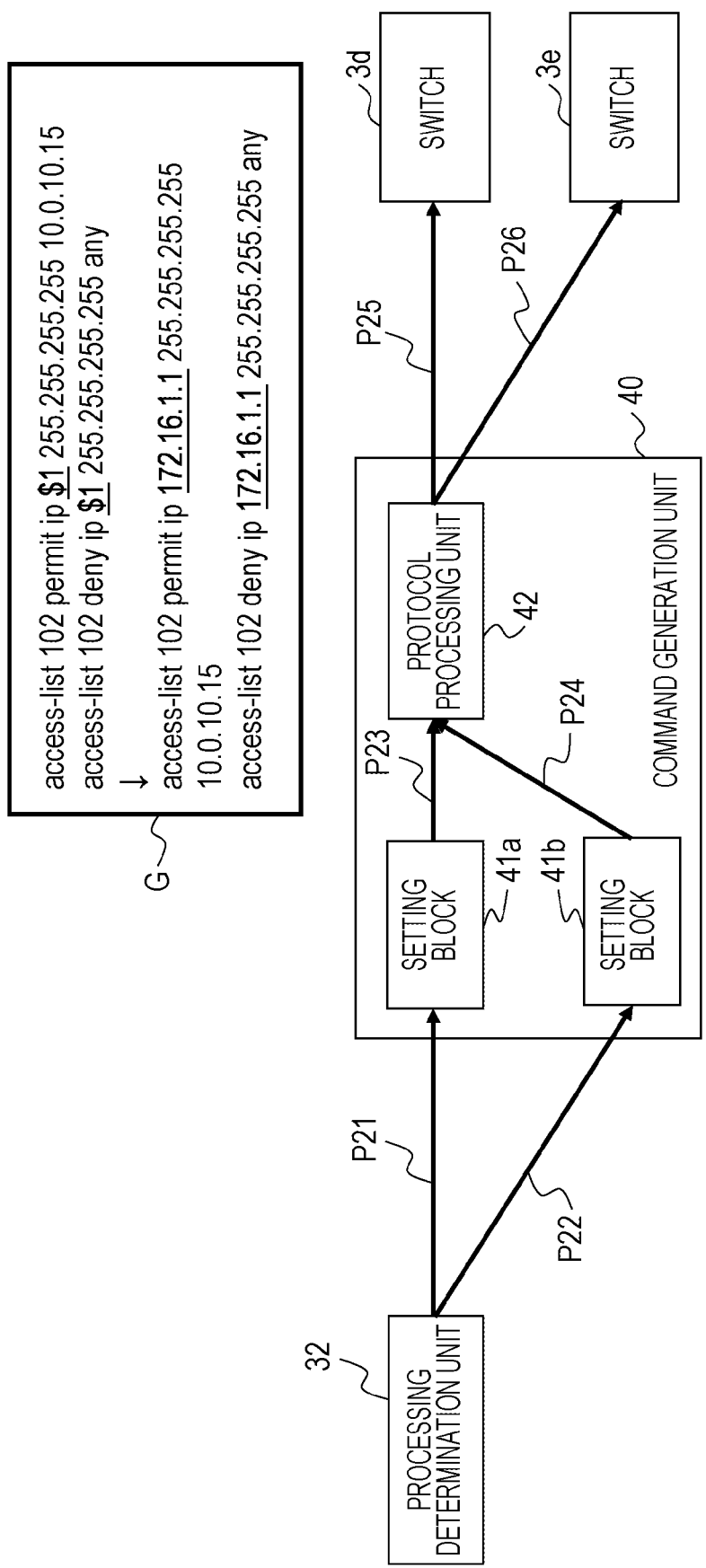
FIG. 8 is a diagram illustrating an example of command generation processing, according to an embodiment.

FIG. 8 is a diagram illustrating an example of command generation processing. An example of processing in a case where setting blocks to set the commands are different for each of companies that manufacture setting target apparatuses will be described with reference to FIG. 8. In FIG. 8, a setting block 41a, a setting block 41b, and a protocol processing unit 42 are included within the command generation unit 40. It is assumed that the setting block 41a sets a command for control processing of a product made by A company, and the setting block 41b sets a command for control processing of a product made by B company. It is assumed that information illustrated in FIG. 7 is included in the apparatus table 53 and the command information 55 provided in the control apparatus 20.

The processing determination unit 32 outputs the following pieces of information, among information obtained by using the execution table 61a illustrated in FIG. 6, to the setting block 41a (Procedural sequence P21).

Address of apparatus for which unauthorized communication is detected: 172.16.1.1 (communication terminal 10c)

Control target 1: switch 3d

Command applied to control target 1: command group CG1

When the pieces of information are acquired, the setting block 41a replaces a character string of $1 within the command of the command group CG1 (CG1 of FIG. 7) with an address of the apparatus for which unauthorized communication is detected, to generate a command used for control processing. G within FIG. 8 illustrates an example of processing in a case where a conditional statement to be transmitted to the switch 3d is generated in the setting block 41a from the conditional statement within the command group CG1. In any of the conditional statements, the setting block 41a replaces $1 of the conditional statement within the command group CG1 with an address of the communication terminal 10c for which unauthorized communication is detected. Accordingly, as illustrated in G of FIG. 8, commands for setting a packet transmitted from 172.16.1.1 (communication terminal 10c) to be transferred only to 10.0.10.15 (quarantine server 2) are generated.

Similarly, the processing determination unit 32 outputs the following pieces of information, among information obtained by using the execution table 61a illustrated in FIG. 6, to the setting block 41b (Procedural sequence P22).

Address of apparatus for which unauthorized communication is detected: 172.16.1.1 (communication terminal 10c)

Control target 2: switch 3e

Command applied to control target 2: command group CG2

Also, in the setting block 41b, the processing for replacing $1 within the conditional statement included in the command group CG2 with an address of the communication terminal 10c for which unauthorized communication is detected is performed. Accordingly, commands for setting a packet transmitted from the communication terminal 10c to be transferred only to the quarantine server 2 in the switch 3e are generated.

The setting block 41a and the setting block 41b outputs the generated commands to the protocol processing unit 42 (Procedural sequences P23 and P24). In this case, the setting block 41a and the setting block 41b output information used for transmission of a command to the protocol processing unit 42, in association with the generated command. For example, the setting block 41a outputs a combination of an IP address of the switch 3d within the apparatus table 53 (FIG. 7) and an ID and password used when control is performed, to the protocol processing unit 42 together with the generated command. Similarly, the setting block 41b also outputs information of the switch 3e within the apparatus table 53 and a command generated for the switch 3e, to the protocol processing unit 42. The protocol processing unit 42 includes the input command in a control packet having a format according to a protocol used for communication with the destination of the command. In the example of FIG. 8, since the control apparatus 20 transmits and receives control information, through telnet, to and from any of the switch 3d and the switch 3e, the protocol processing unit 42 generates a control packet having a format coincident with telnet from the input command. The protocol processing unit 42 transmits the generated control packet to an apparatus of the destination through the transmission unit 23 (Procedural sequences P25 and P26).

In the description as described above, although a case where telnet is used for communication between the control apparatus 20 and the transfer apparatus is described as an example, any protocol may be used for communication between the control apparatus 20 and the transfer apparatus. For example, the control apparatus 20 may control transfer processing by the router 4 or the switch 3, by using a secure shell (SSH), a hypertext transfer protocol (HTTP), or the like.

The command generation unit 40 may not be divided into a setting block 41 and a protocol processing unit 42. In this case, the command generation unit 40 operates as both the setting block 41 and the protocol processing unit 42.

Figure 9:
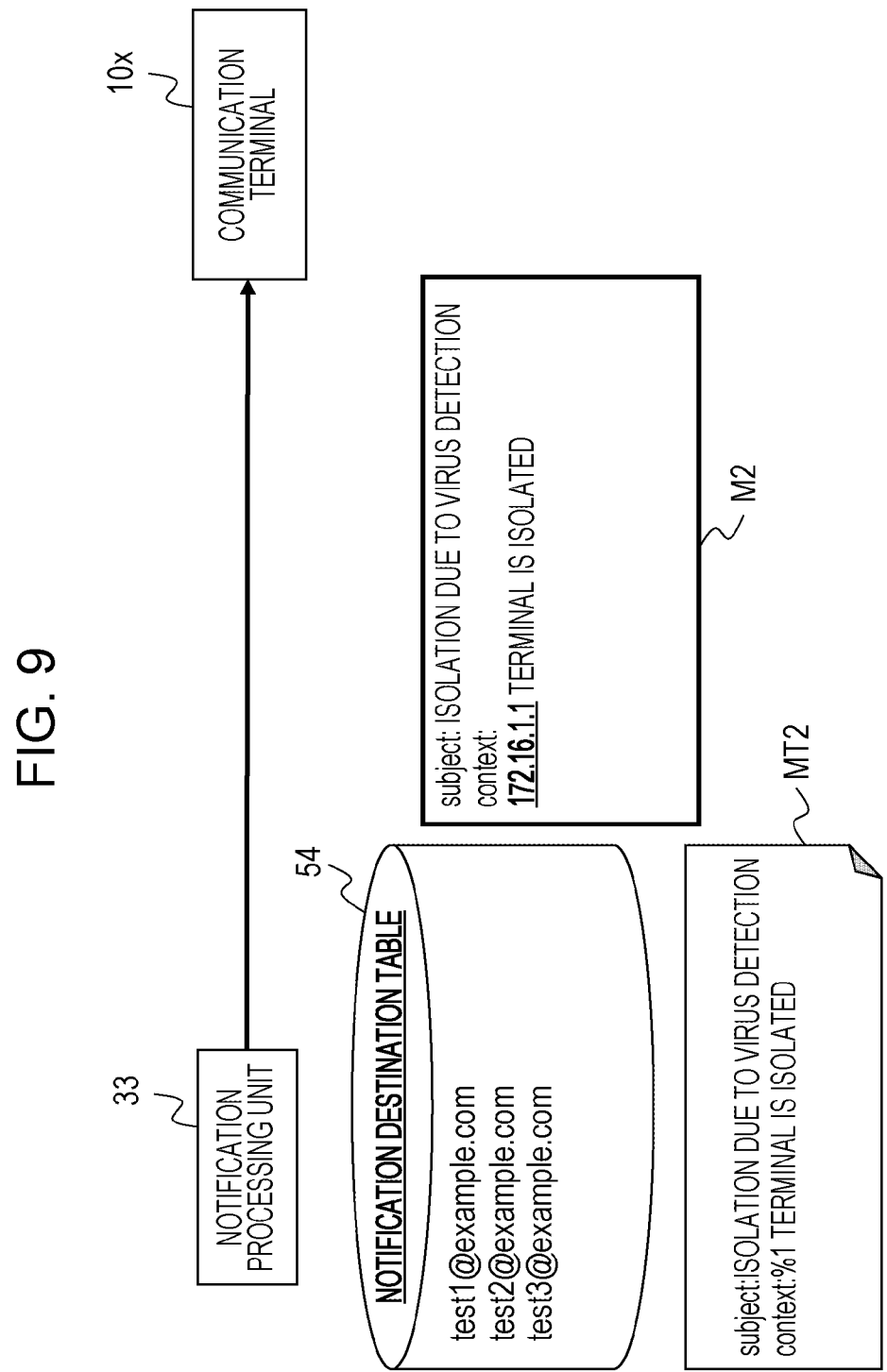
FIG. 9 is a diagram illustrating an example of notification processing by e-mail, according to an embodiment.

FIG. 9 is a diagram illustrating an example of notification processing by e-mail. The processing determination unit 32 notifies an address of the communication terminal 10 for which unauthorized communication is detected and an e-mail template used for the notification processing to the notification processing unit 33. In an example of FIG. 9, it is assumed that the notification processing unit 33 is notified that the address of an apparatus for which unauthorized communication has been detected is 172.16.1.1 (communication terminal 10c) and an e-mail template MT2 is to be used.

The notification processing unit 33 replaces a character string in the e-mail template MT2, which is to be replaced with an IP address of the communication terminal 10 for which unauthorized communication is detected, with the IP address notified from the processing determination unit 32. A character string corresponding to "%1" in the MT2 of FIG. 9 is the character string to be replaced with an IP address of the communication terminal 10 for which unauthorized communication is detected. The notification processing unit 33 replaces a character string of "%1" in the e-mail template MT2 with an IP address of 172.16.1.1 to generate an e-mail M2.

Next, the notification processing unit 33 references a notification destination table 54 for specifying the destination of a notification e-mail, and performs processing for transmitting the generated e-mail to respective addresses within the notification destination table 54. In an example of FIG. 9, three e-mail addresses including test1@example.com or the like are recorded in the notification destination table 54. The notification processing unit 33 generates a notification e-mail of a sentence illustrated in the e-mail M2 for each of three addresses within the notification destination table 54. Thereafter, when a packet including information of the generated e-mail is generated, the notification processing unit 33 transmits the generated packet to a destination through the transmission unit 23. For example, it is assumed that an operator uses an address of test1@example.com for a communication terminal 10x. Then, the notification e-mail of a sentence illustrated in the e-mail M2 is transmitted to the communication terminal 10x in connection with the execution of the isolation processing described with reference to FIG. 8. Accordingly, the operator may recognize that the communication terminal 10c is isolated due to a fact that a virus is detected in the communication terminal 10 (communication terminal 10c) to which an IP address of 172.16.1.1 is allocated.

Although an example of a case where detection of unauthorized communication is notified from the detection server 8 to the control apparatus 20 by e-mail is described with reference to FIG. 4 to FIG. 9, the notification from the detection server 8 may be performed using Syslog or SNMP Trap. In the following, an example of processing in a case where the notification from the detection server 8 is performed using Syslog or SNMP Trap will be described.

Figure 10:
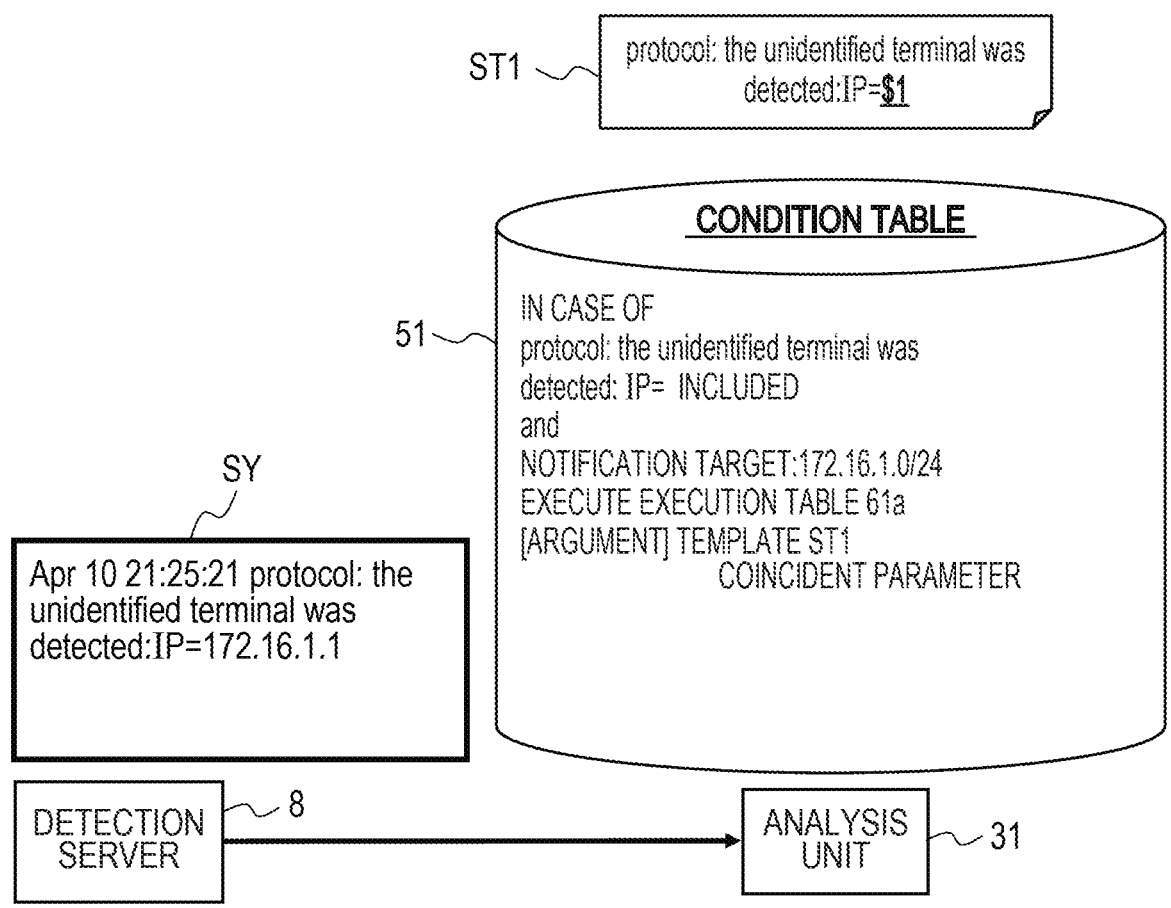
FIG. 10 is a diagram illustrating an example of analysis processing when Syslog is received, according to an embodiment.

FIG. 10 is a diagram illustrating an example of analysis processing when the control apparatus 20 receives Syslog from the detection server 8. It is assumed that the detection server 8 detects that an IP address=172.16.1.1 (communication terminal 10c) is infected with a virus. Then, the detection server 8 transmits Syslog including a time at which the virus is detected and information of the communication terminal 10, for which the virus is detected, to the control apparatus 20. SY of FIG. 10 is an example of Syslog transmitted from the detection server 8 to the control apparatus 20.

When Syslog is acquired via the reception unit 22, the analysis unit 31 of the control apparatus 20 compares Syslog with respective conditions within the condition table 51. In FIG. 10, a single example of a condition is extracted from the condition table 51, which may be applied to notification by Syslog, and illustrated in order to make easy to understand. In an example of FIG. 10, a combination of a character string within protocol of Syslog and a notification target is included in the condition table 51. The analysis unit 31 specifies a type of unauthorized communication by using the character string within protocol. For example, it is assumed that a character string of "protocol: the unidentified terminal was detected" is included within protocol of Syslog. In this case, the condition table 51 determines that one of the communication terminals 10 is infected with a virus. Similar to a case where notification by e-mail is performed, as a notification target, an address of the communication terminal 10 for which unauthorized communication is detected when the condition is used is correlated also with the conditions used in processing for Syslog.

Next, notification of a virus infection is made and thus the analysis unit 31 selects a template used for analysis of Syslog notifying the virus infection from the template information 52. In an example of FIG. 10, it is assumed that the analysis unit 31 selects a Syslog template ST1. The analysis unit 31 compares Syslog with the Syslog template ST1. The Syslog template ST1 designates a character string, which corresponds to "$1" when description of protocol is regarded as a "protocol: the unidentified terminal was detected: IP=$1", as an address of the communication terminal 10 infected with a virus. In the example of FIG. 10, the analysis unit 31 compares the Syslog template ST1 and a character string of Syslog to determine that the communication terminal 10 (communication terminal 10c) to which an address of 172.16.1.1 is allocated is infected with a virus.

Processing performed by the analysis unit 31 after the communication terminal 10 infected with a virus is specified is similar to a case where notification from the detection server 8 is performed using e-mail. That is, the analysis unit 31 determines the execution table 61 to be applied to processing by using the condition table 51, and notifies information of the execution table 61 to be applied and an address of the communication terminal 10 infected with a virus to the processing determination unit 32. Processing by the processing determination unit 32, the notification processing unit 33, and the command generation unit 40 is also similar to a case where notification from the detection server 8 is performed by e-mail.

Figure 11:
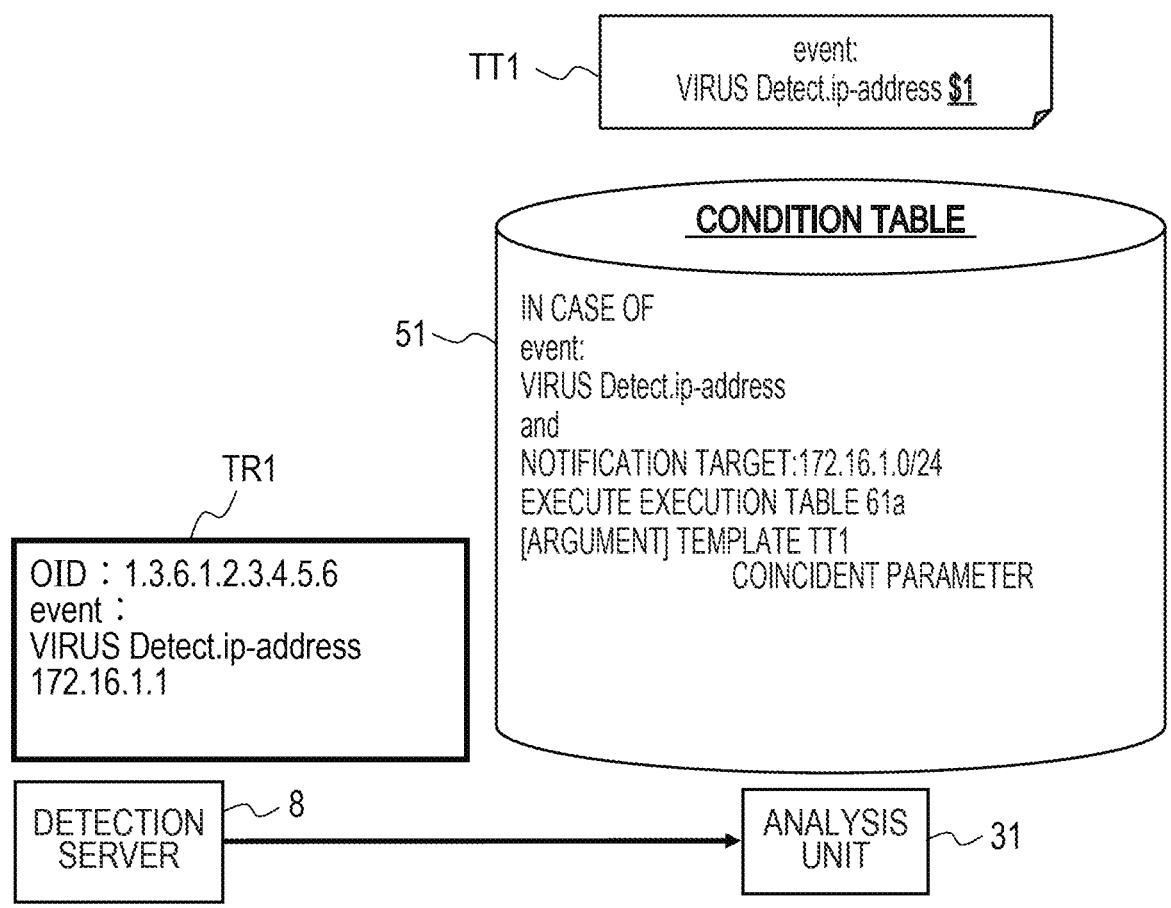
FIG. 11 is a diagram illustrating an example of analysis processing when Trap is received, according to an embodiment.

FIG. 11 is a diagram illustrating an example of analysis processing when the control apparatus 20 receives Trap from the detection server 8. It is assumed that the detection server 8 detects that IP address=172.16.1.1 (communication terminal 10c) is infected with a virus. Then, the detection server 8 transmits Trap notifying that the virus is detected to the control apparatus 20. TR1 of FIG. 11 is an example of Trap transmitted from the detection server 8 to the control apparatus 20. In TR1, information of virus detection is notified for object identifier (OID)=1.3.6.1.2.3.4.5.6. Information indicating that 172.16.1.1 is an address of the communication terminal 10 for which virus is detected, is also included in the TR1.

When Trap is acquired via the reception unit 22, the analysis unit 31 of the control apparatus 20 compares Trap with respective conditions within the condition table 51. In FIG. 11, a single example of a condition that may be applied to notification by Trap is extracted from the condition table 51 and illustrated in order to make easy to understand. In an example of FIG. 11, description that one of the communication terminals 10 is determined as being infected with a virus in a case where a character string of "event: VIRUS Detect.ip-address" is included within Trap is described in the condition table 51. Similar to a case where the notification by e-mail is performed, as a notification target, an address of the communication terminal 10 for which unauthorized communication is detected when the condition is used, is correlated also with the conditions used in processing for Trap.

Next, a notification of virus infection is made and thus the analysis unit 31 selects a template used for analysis of Trap notifying virus infection from the template information 52. In an example of FIG. 11, it is assumed that the condition table 51 selects a Trap template TT1. The analysis unit 31 compares Trap with the Trap template TT1. The Trap template TT1 designates a character string, which corresponds to "$1" when description of event within Trap is regarded as an "event: VIRUS Detect.ip-address $1", as an address of the communication terminal 10 infected with a virus. In the example of FIG. 11, the analysis unit 31 compares the Trap template TT1 and a character string of Trap to determine that the communication terminal 10 (communication terminal 10c) to which an address of 172.16.1.1 is allocated is infected with a virus.

Processing performed by the analysis unit 31 after the communication terminal 10 infected with a virus is specified is similar to a case where a notification from the detection server 8 is performed using e-mail or Syslog. Processing performed by the processing determination unit 32, the notification processing unit 33, and the command generation unit 40 is also similar to a case where a notification from the detection server 8 is performed by e-mail.

Figure 12:
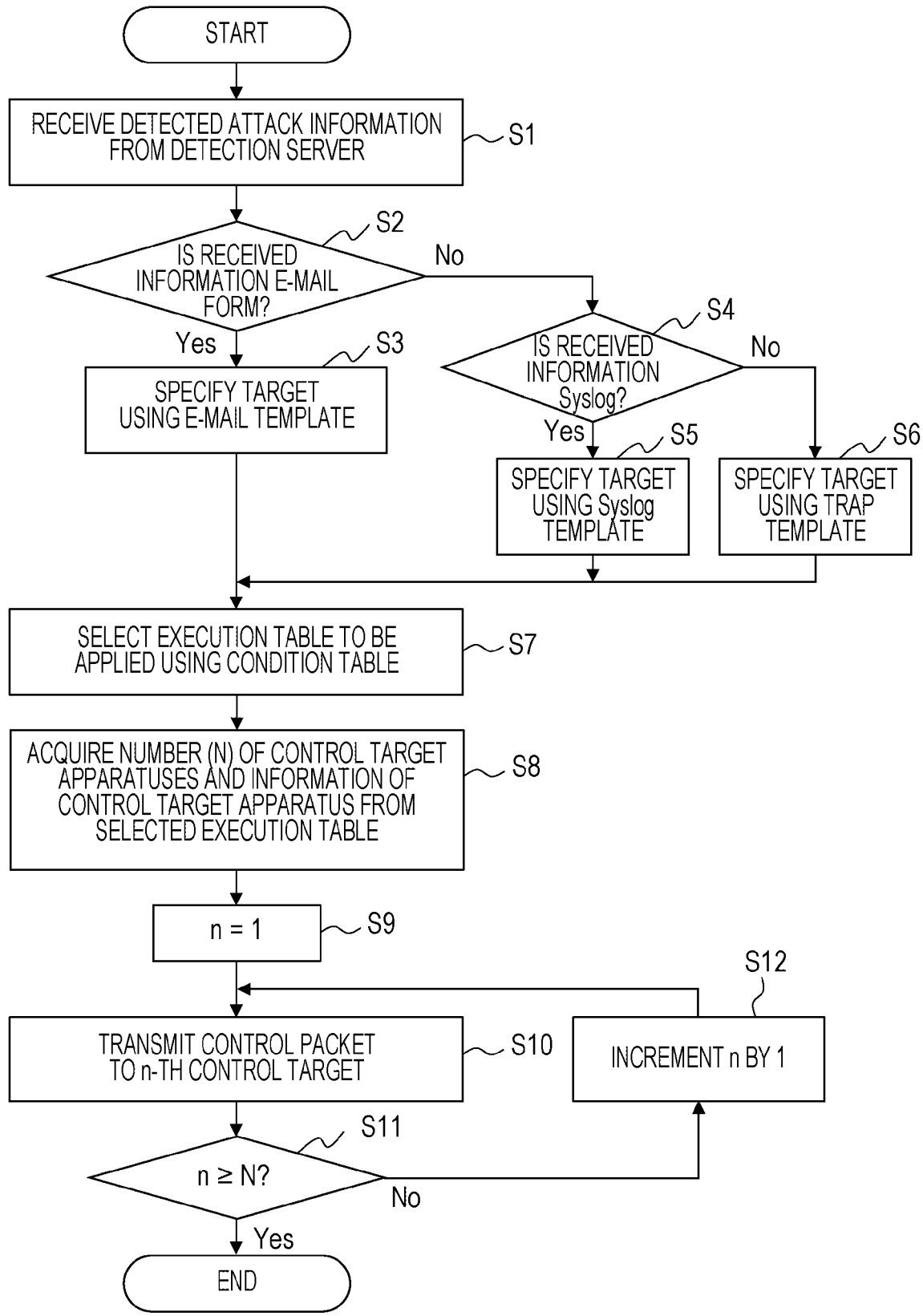
FIG. 12 is a diagram illustrating an example of an operational flowchart for processing performed when an apparatus is isolated, according to an embodiment.

FIG. 12 is an operational flowchart illustrating an example of processing performed when an apparatus is isolated. In FIG. 12, a fixed number N and a variable n are used. The fixed number N is a total number of apparatuses which become a control target for isolating the communication terminal 10 which becomes a target of attack, and the variable n is used for counting the number of apparatuses for which control is performed.

The reception unit 22 within the control apparatus 20 receives information of an attack detected by the detection server 8 (Step S1). Information received as indicating an attack is not limited to infection by virus and includes any type of unauthorized communication. The analysis unit 31 determines whether reception information received from the detection server 8 is an e-mail form (Step S2). In a case where the reception information is the e-mail form, the analysis unit 31 specifies a communication terminal 10 which becomes a target by using the e-mail template (Yes in Step S2 and Step S3). It is assumed that the "target" is the communication terminal 10 for which unauthorized communication is detected and includes a target of an attack by malware such as a virus or the like. In a case where the reception information received from the detection server 8 is not the e-mail form, the analysis unit 31 determines whether the reception information received from the detection server 8 is Syslog (No in Step S2 and Step S4). In a case where the reception information is Syslog, the analysis unit 31 specifies the communication terminal 10 which became the target by using the Syslog template (Yes in Step S4 and Step S5). In a case where the reception information is not Syslog, the analysis unit 31 specifies the communication terminal 10 which became the target by using the Trap template (No in Step S4 and Step S6).

When any of processing of Steps S3, S5, and S6 is ended, the analysis unit 31 selects the execution table 61 to be applied by using the condition table 51 (Step S7). The analysis unit 31 notifies a selection result of the execution table 61 and information on the communication terminal 10 which became the target to the processing determination unit 32. The processing determination unit 32 acquires the total number (N) of apparatuses of the control target and information of the apparatus of the control target from the selected execution table 61 (Step S8). The command generation unit 40 sets the variable n at 1 (Step S9). The command generation unit 40 generates a command to be transmitted to an n-th control target and transmits a control packet including the command to the n-th control target via the transmission unit 23 (Step S10). Thereafter, the command generation unit 40 determines whether the variable n is greater than or equal to the fixed number N (Step S11). In a case where the variable n is less than the fixed number N, the command generation unit 40 increments the variable n by 1 and processing returns to Step S10 (No in Step S1 and Step S12). On the other hand, in a case where the variable n is greater than or equal to the fixed number N, the command generation unit 40 determines that the command is transmitted to all of the apparatuses of the control target, and the processing is ended (Yes in Step S11).

As such, according to a method of the first embodiment, control according to a type of detected unauthorized communication or the like may be easily performed on the transfer apparatus within the network. A template or an execution table 61 to be applied may be changed according to a type of malware or the like to change control contents of the network according to the type of malware or the like as well. Accordingly, various different measures may be taken against unauthorized communication with simple processing in the system including the control apparatus 20.

Processing for information received from the detection server 8 is performed by the analysis unit 31, and control processing for each apparatus is performed by processing of the command generation unit 40 and the transmission unit 23. Accordingly, even when a specification of the detection server 8 or a transfer apparatus within the system is changed, change in the control apparatus 20 is restrictive and thus, development of the control apparatus 20 is easy. In the control apparatus 20 according to the first embodiment, processing to be performed when an attack is confirmed may be autonomously executed based on notification from the detection server 8, and thus processing after an infection is confirmed is also quickly performed.

The control apparatus 20 has an advantage that information of the condition table 51 stored in the control apparatus 20, the execution information database 60, or the like may be changed to flexibly change the contents of control as well. In recent years, types of malware are also increasing rapidly and for example, malware is developed for which analysis becomes difficult in a case where connection of a cable of the communication terminal 10 being regarded as the target is changed or in a case where a power supply is turned off, and behaviors of malware vary widely. Accordingly, managing by an operator becomes easy in the system by using the control apparatus 20 of which the control contents may be flexibly changed.

Second Embodiment

In a second embodiment, description will be made on a case where the control apparatus 20 controls the transfer apparatus such that the isolated communication terminal 10 is able to communicate similar to before being isolated, for example, in a case where malware is removed from the communication terminal 10 which became a target. First, an example of information used when isolation is released will be described. The same type of apparatus table 53 is used both when isolation of the communication terminal 10 is released and when the communication terminal 10 is isolated.

Figure 13:
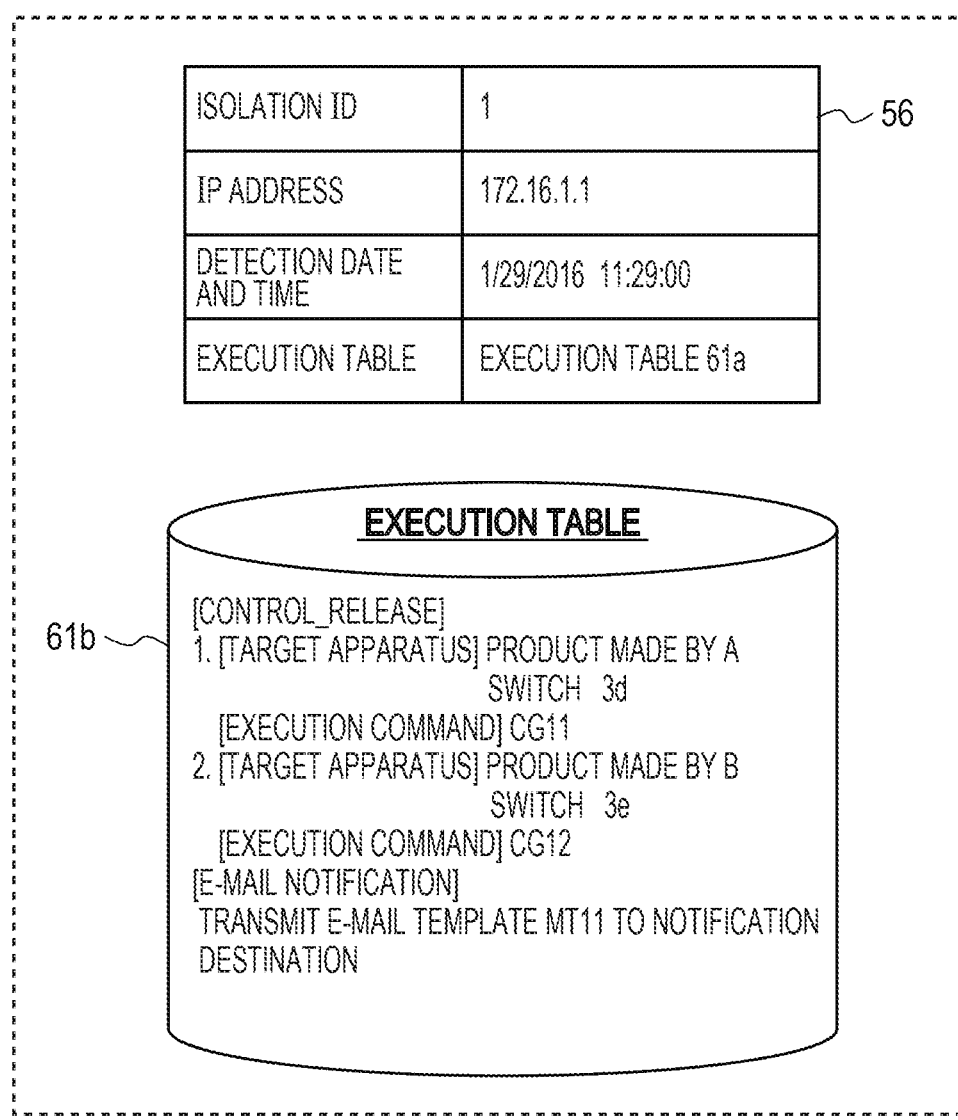
FIG. 13 is a diagram illustrating an example of an isolation status table and an execution table, according to an embodiment.

FIG. 13 is a diagram illustrating an example of the isolation status table 56 and the execution table 61. FIG. 13 illustrates an example of the isolation status table 56 in a case where the communication terminal 10c is isolated. In an example of FIG. 13, an isolation ID, an IP address, a detection date and time, and an execution table are recorded in the isolation status table 56. The isolation ID is identification information correlated with each isolation processing and a different ID is allocated to each communication terminal 10 which became an isolation target. The IP address is an IP address allocated to the communication terminal 10 which became an isolation target. In the example of FIG. 13, an address (172.16.1.1) of the communication terminal 10c is recorded in an IP address field. The detection date and time is information of the time at which unauthorized communication, which causes isolation of the communication terminal 10c, is detected. The execution table is information for identifying an execution table 61, which is used for isolation of the communication terminal 10 indicated by the entry of the isolation status table 56. IN the example of FIG. 13, the entry indicates that the execution table 61a as the execution table is used for isolation of an apparatus (communication terminal 10c) to which an address of 172.16.1.1 is allocated.

In the second embodiment, it is assumed that the processing determination unit 32 beforehand stores information that specifies processing used for releasing the isolation processing performed by the execution table 61, for each of execution tables 61 with the possibility of being used for isolation. For example, it is assumed that the processing determination unit 32 beforehand stores information indicating that the execution table 61b is usable for releasing the isolation processing performed by the execution table 61a. In the example of FIG. 13, the execution table 61a is used in the isolation processing of the communication terminal 10c and thus, the processing determination unit 32 may determine that the execution table 61b is used when isolation of the communication terminal 10c is released.

FIG. 13 illustrates, as an execution table 61, the execution table 61b including information used when isolation of the communication terminal 10c, to which an address of IP address=172.16.1.1 is allocated, is released. In the execution table 61b, release of isolation of the communication terminal 10c for which infection is detected and e-mail notification processing for notifying to an operator that isolation is released, are recorded as processing contents. Furthermore, an apparatus which becomes a control target when isolation of the communication terminal 10c is released and a command group executed for control of each apparatus of the control target are correlated with information of each apparatus.

For example, in the network illustrated in FIG. 4, when isolation for the communication terminal 10c is released, the switch 3d and the switch 3e which became the control target when the communication terminal 10c is isolated are caused to resume communication before the communication terminal 10c is isolated. In the example of the execution table 61b, the switch 3d and the switch 3e within the network N2 are recorded as a control target for releasing isolation of the communication terminal 10c. Also, in the execution table 61b, in a manner similar to the execution table 61a (FIG. 6), information indicating that the switch 3d is a product made by A company, and information (CG11) of the command group used for control of the switch 3d are recorded. Similarly, also regarding the switch 3e, information indicating that the switch 3e is a product made by B company and information indicating that a command group CG12 is used for control of the switch 3e are registered in the execution table 61b. In the execution table 61b, information indicating that notification e-mail generated using the e-mail template MT11 is transmitted to each notification destination included in the notification destination table 54 is registered.

Figure 14:
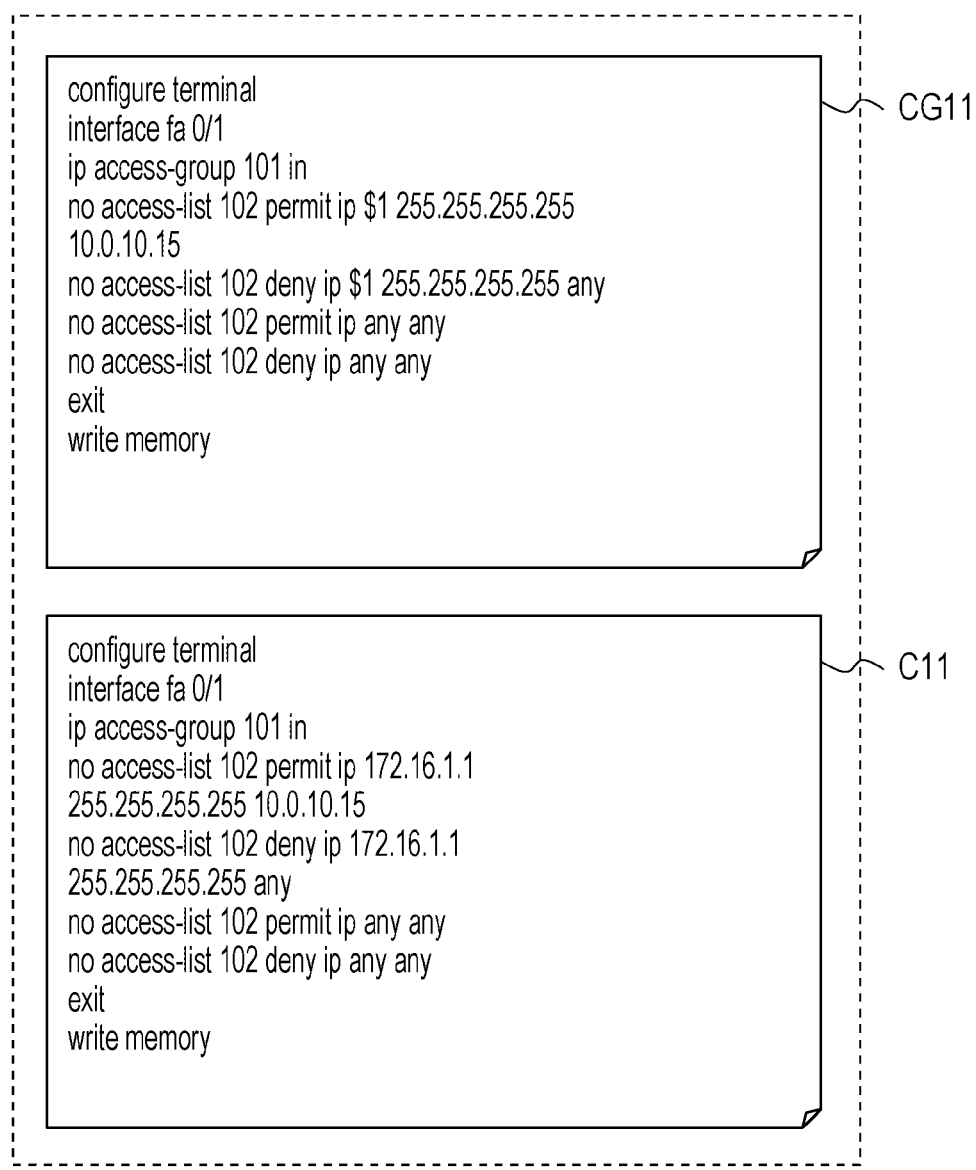
FIG. 14 is a diagram illustrating an example of command information, according to an embodiment.

FIG. 14 is a diagram illustrating an example of command information 55. The command group CG11 is a group of commands used for releasing the controls that have been performed by the command group CG1 (FIG. 7) in the switch 3d. In the command group CG11, information indicating that a condition of ACL number=101 is applied to filtering for the packets arriving at the interface Fa 0/1 is described. The condition of ACL number=101 is a condition that was applied before processing by the command group CG11 is performed. That is, processing for applying the condition of ACL number=101 to filtering represents that a condition for filtering prior to performing isolation of the communication terminal 10 is to be used. Further, in the command group CG11, a command for deleting a conditional statement for access control is included. In the command group CG11, $1 is included as information to be replaced with an IP address of the communication terminal 10 of a releasing target of isolation. A first command for deletion of a conditional statement among the command group GC11 represents deletion of setting that permits a packet whose destination is 10.0.10.15 (IP address of quarantine server 2), among IP packets whose transmission source is regarded as the communication terminal 10 of a releasing target of isolation. In a second command for deletion of a conditional statement, information indicating that setting for denying all of the IP packets whose transmission source is regarded as the communication terminal 10 are to be deleted, is described. In a third command for deletion of a conditional statement, information indicating that setting for permitting a packet for any of a transmission source and a destination in a condition of ACL number=102 is to be deleted, is described. In a fourth command for deletion of a conditional statement, information indicating that setting for denying a packet for any of a transmission source and a destination in a condition of ACL number=102 is to be deleted, is described.

The setting block 41a replaces a character string of $1 within the commands of the command group CG11 with an address of an apparatus designated as a releasing target of isolation to generate a command used for control processing. C11 within FIG. 14 is an example of commands in a case where a character string of $1 within the conditional statement within the command group CG11 is replaced with the communication terminal 10c (IP address=172.16.1.1).

Figure 15:
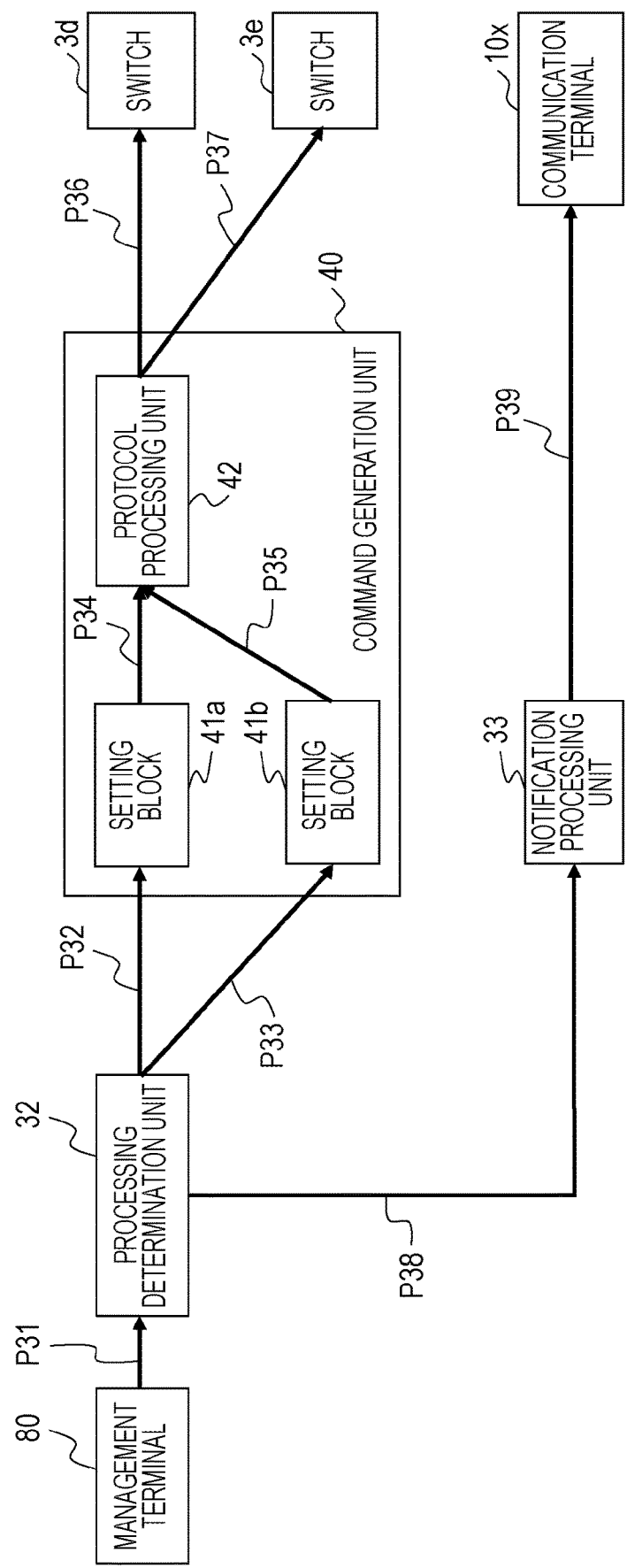
FIG. 15 is a diagram illustrating an example of processing performed when isolation is released, according to an embodiment.

FIG. 15 is a diagram illustrating an example of processing performed when isolation is released. In the following, in a case where information described with reference to FIG. 13 and FIG. 14 is used, an example of processing in a case where isolation of the communication terminal 10c is released will be described. Also, in the second embodiment, it is assumed that control for isolation accompanied by detection of unauthorized communication is performed in a manner similar to the first embodiment.

An operator performs processing for requesting the control apparatus 20 to release isolation, for example, in a case where malware is removed from the communication terminal 10 which became a target. The operator may input an IP address allocated to the communication terminal 10 for which releasing of isolation is requested from an input device 103 of the control apparatus 20. The operator may transmit a request packet, which includes an IP address allocated to the communication terminal 10 for which releasing of isolation is requested, from the management terminal 80 used for management of the system to the control apparatus 20.

In Procedural sequence P31, when a notification from a management apparatus 80 or information input from the input device 103 is acquired, the analysis unit 31 specifies an IP address of the communication terminal 10 whose isolation is to be released, based on the obtained information. The analysis unit 31 notifies the processing determination unit 32 of the specified IP address and information indicating that release processing for isolation is requested.

The processing determination unit 32 outputs the following pieces of information, among pieces of information obtained using the isolation status table 56 and the execution table 61b illustrated in FIG. 13, to the setting block 41a (Procedural sequence P32).

Address of apparatus of which isolation is released: 172.16.1.1 (communication terminal 10c)
  Control target 1: switch 3d
  Command to be applied to control target 1: Command group CG11

When the pieces of information are acquired, the setting block 41a replaces a character string of $1 within the commands of the command group CG11 (FIG. 14) with an address of an apparatus of a releasing target of isolation to generate a command (C11 of FIG. 14) used for control processing.

Similarly, the processing determination unit 32 outputs the following pieces of information, among pieces of information obtained using the execution table 61b (FIG. 13), to the setting block 41b (Procedural sequence P33).

Address of apparatus of which isolation is released: 172.16.1.1 (communication terminal 10c)
  Control target 2: switch 3e
  Command to be applied to control target 2: Command group CG12

When the pieces of information are acquired, the setting block 41b replaces a character string of $1 within the commands of the command group CG12 with an address of an apparatus of a releasing target of isolation to generate a command used for control processing.

The setting block 41a and the setting block 41b output a generated command to a protocol processing unit 42 (Procedural sequences P34 and P35). In this case, the setting block 41a and the setting block 41b acquire information used for transmission of the command from the apparatus table 53 (FIG. 7), and output the command to the protocol processing unit 42 in association with the acquired information. Information or the like acquired by the setting block 41 from the apparatus table 53 is similar to Procedural sequences P23 and P24 described with reference to FIG. 8. The protocol processing unit 42 includes the input command in a control packet according to a protocol used for communication with a destination of the command. The protocol processing unit 42 transmits the generated control packet to an apparatus of the destination via the transmission unit 23 (Procedural sequences P36 and P37).

In Procedural sequence P38, the processing determination unit 32 notifies an address of an apparatus whose isolation is released and an e-mail template used for notification processing, to the notification processing unit 33. The notification processing unit 33 transmits a notification e-mail to an apparatus recorded in the notification destination table 54 by using the notified template and address information (Procedural sequence P39). Details of processing performed in Procedural sequence P38 and Procedural sequence P39 will be described with reference to FIG. 16.

Figure 16:
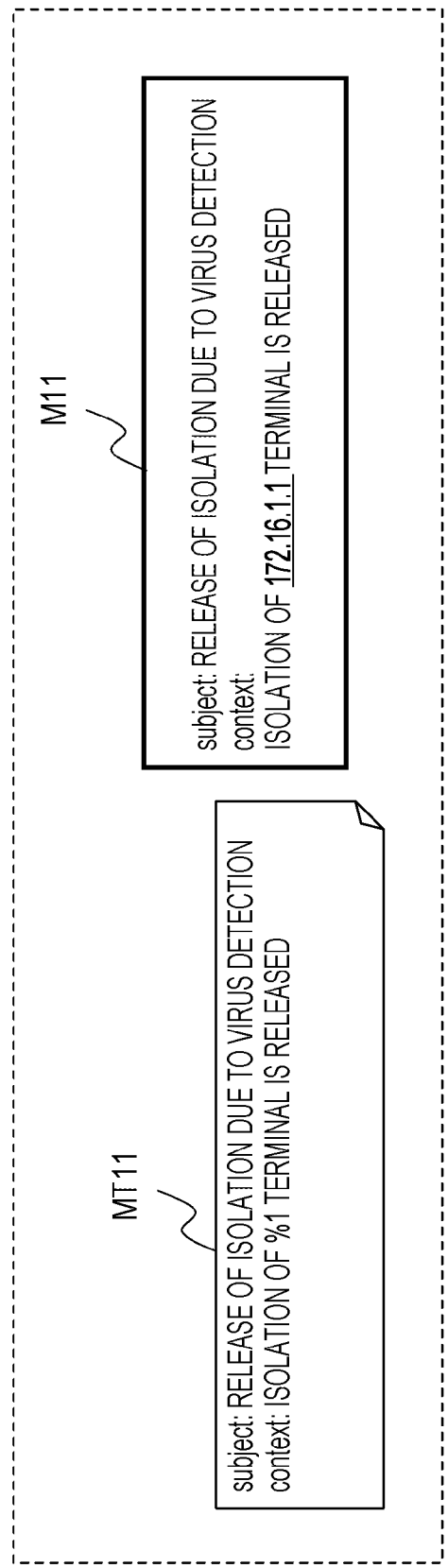
FIG. 16 is a diagram illustrating an example of notification processing by e-mail, according to an embodiment.

FIG. 16 is a diagram illustrating an example of notification processing by e-mail. In an example of FIG. 16, information indicating that an address of the communication terminal 10 whose isolation is released is 172.16.1.1 (communication terminal 10c) and an e-mail template MT11 is used, is notified to the notification processing unit 33. The notification processing unit 33 replaces a character string in the e-mail template MT11, which is to be replaced with an IP address of the communication terminal 10 whose isolation is released, with the IP address notified from the processing determination unit 32. In the MT11 of FIG. 16, a character string corresponding to "%1" is a character string to be replaced with an IP address of the communication terminal 10 whose isolation is released. The notification processing unit 33 replaces the character string of "%1" in the e-mail template MT11 with an IP address of 172.16.1.1 to generate the e-mail M11.

Figure 17:
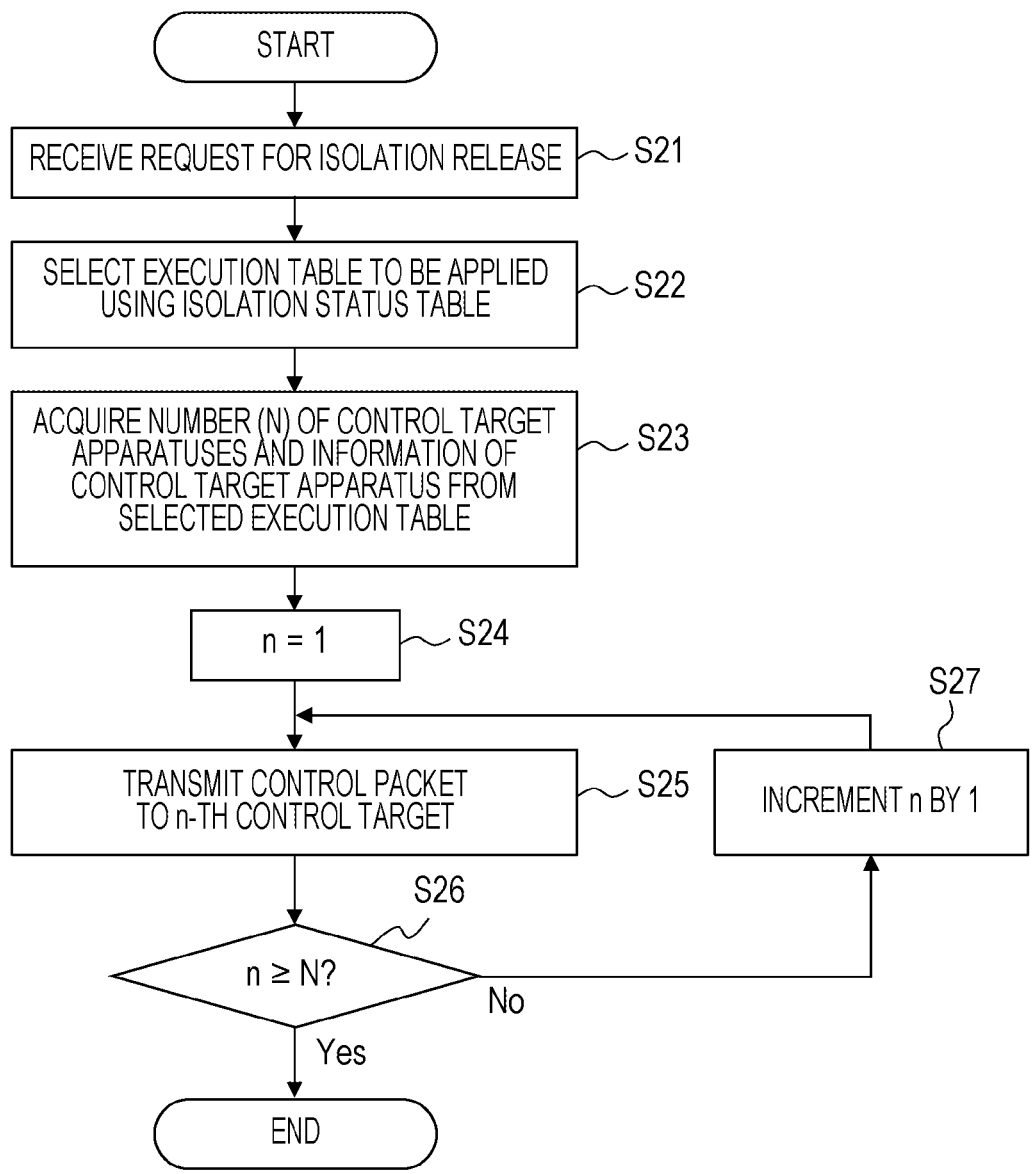
FIG. 17 is a diagram illustrating an example of an operational flowchart for processing performed when isolation is released, according to an embodiment.

FIG. 17 is an operational flowchart illustrating an example of processing performed when isolation is released. In FIG. 17, the fixed number N is a total number of apparatuses which become a control target for releasing an isolation state of the communication terminal 10, and a variable n is used for counting the number of apparatuses for which control is performed.

The reception unit 22 of the control apparatus 20 receives a request for release of isolation (isolation release request) from the management apparatus 80 (Step S21). The processing determination unit 32 selects the execution table 61 to be applied, by using the isolation status table 56 (Step S22). The processing determination unit 32 acquires the total number (N) of control targets and information of the apparatus of control target from the selected execution table 61 (Step S23). The command generation unit 40 sets the variable n at 1 (Step S24). The command generation unit 40 generates a command to be transmitted to an n-th control target and transmits a control packet including the command to the n-th control target via the transmission unit 23 (Step S25). Thereafter, the command generation unit 40 determines whether the variable n is greater than or equal to the fixed number N (Step S26). In a case where the variable n is less than the fixed number N, the command generation unit 40 increments the variable n by 1 and the processing returns to Step S25 (No in Step S26 and Step S27). On the other hand, in a case where the variable n is greater than or equal to the fixed number N, the command generation unit 40 determines that the commands have been transmitted to all of the apparatuses of the control target, and the processing is ended (Yes in Step S26).

In the description of FIG. 13 to FIG. 17, although a case where releasing of isolation is performed on the isolated communication terminal 10 is described as an example, processing performed in response to release processing by the management apparatus 80 is not limited to releasing of isolation. For example, in a case where a path which is usable by the communication terminal 10 is limited or a transfer speed which is usable by the communication terminal 10 is limited, the limitations on the path and transfer speed may be released by processing similar to the processing described in the second embodiment. In this case, it is assumed that information capable of uniquely specifying the communication terminal 10 on which limitation is made and the execution table 61 used for releasing the limitation currently being made is maintained in a form similar to the isolation status table 56.

As such, according to a method of the second embodiment, even when processing for the isolated communication terminal 10 or the like is released, control according to a type of attack may be easily performed on the transfer apparatus within the network. Accordingly, releasing of processing performed accompanied by the detection of unauthorized communication as well as processing to be performed after malware infection or detection of unauthorized communication are rapidly performed. In a case where various countermeasures to be performed against malware infection exist, as described in the second embodiment, the execution table 61 used for releasing countermeasures against malware infection is determined in advance to reduce load of the operator. Accordingly, management by the operator becomes easy in the system using the second embodiment.

Third Embodiment

In a case where a large number of apparatuses are included in the system or in a case where a possibility that switching of the transfer apparatus occurs is high, it is desirable that setting of the system is performed more flexibly than the first and second embodiment. Accordingly, information stored in the control apparatus may be configured in such a way that a plurality of tables are unified and a single table or a database may be respectively divided into a plurality of tables or databases in order for setting of the system to be performed easily. In the third embodiment, an example of such data deformation will be described using a specific example.

Figure 18:
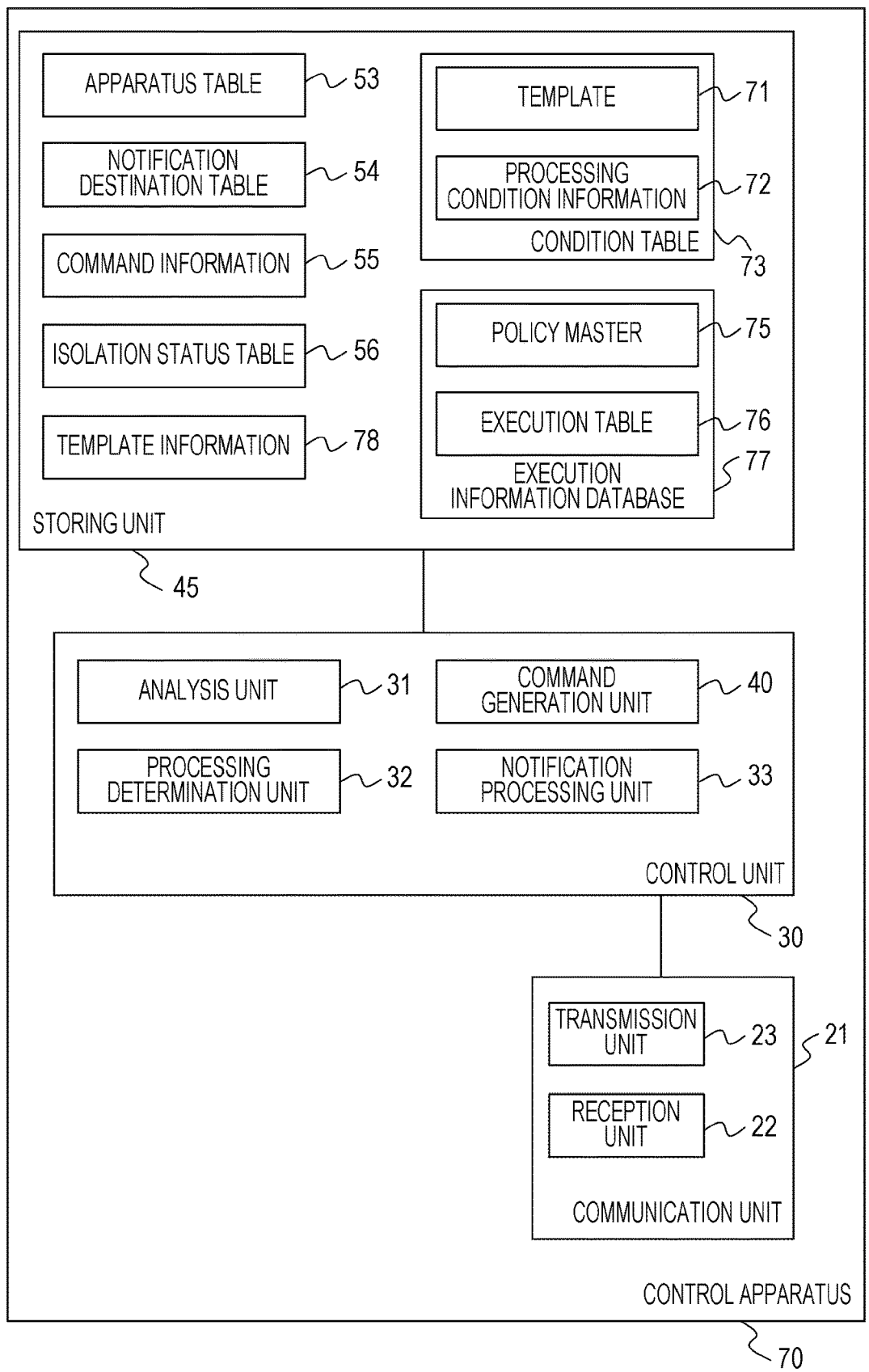
FIG. 18 is a diagram illustrating an example of a configuration of a control apparatus, according to an embodiment.

FIG. 18 is a diagram illustrating an example of a configuration of a control apparatus 70 according to a third embodiment. The control apparatus 70 includes a communication unit 21, a control unit 30, and a storing unit 45. The storing unit 45 includes a condition table 73, an execution information database 77, an apparatus table 53, a notification destination table 54, command information 55, an isolation status table 56, and template information 78. The communication unit 21 and the control unit 30 are similar to those of the first embodiment.

The condition table 73 includes a template 71 and processing condition information 72. The template 71 corresponds to a template among the template information 52 described in the first embodiment, which is used for analysis of notification transmitted from the detection server 8. The processing condition information 72 includes information of the condition table 51 described in the first embodiment. That is, in the third embodiment, the condition table 73 is a table obtained by integrating the condition table 51 and the template used for analysis of notification and is set for each target to which processing is to be applied. As the template 71 used for analysis of notification, an e-mail template MT1 used for analysis of a notification e-mail, a Syslog template ST1, a Trap template TT1, or the like may be included in the condition table 73. On the other hand, the template information 78 is a template used for the control apparatus 70 to generate an e-mail to be transmitted to a notification destination registered in the notification destination table 54.

The execution information database 77 includes a policy master 75 and an execution table 76. In FIG. 18, although only a single execution table 76 is illustrated in order to make easy to understand, a plurality of execution tables 76 may be included in the execution information database 77. The policy master 75 is used when determining which one of the execution tables 76 included in the execution information database 77 is to be applied. In the apparatus table 53, information of respective transfer apparatuses within the system is recorded for each transfer apparatus. It is assumed that the control apparatus 70 includes the same number of apparatus tables 53 as those of the transfer apparatuses within the system.

It is assumed that the control apparatus 70 also includes hardware similar to that of the control apparatus 20. The processor 101 implements the control unit 30, and the memory 102 and the storage device 106 operate as the storing unit 45. The network interface 109 operates as the communication unit 21.

Figure 19:
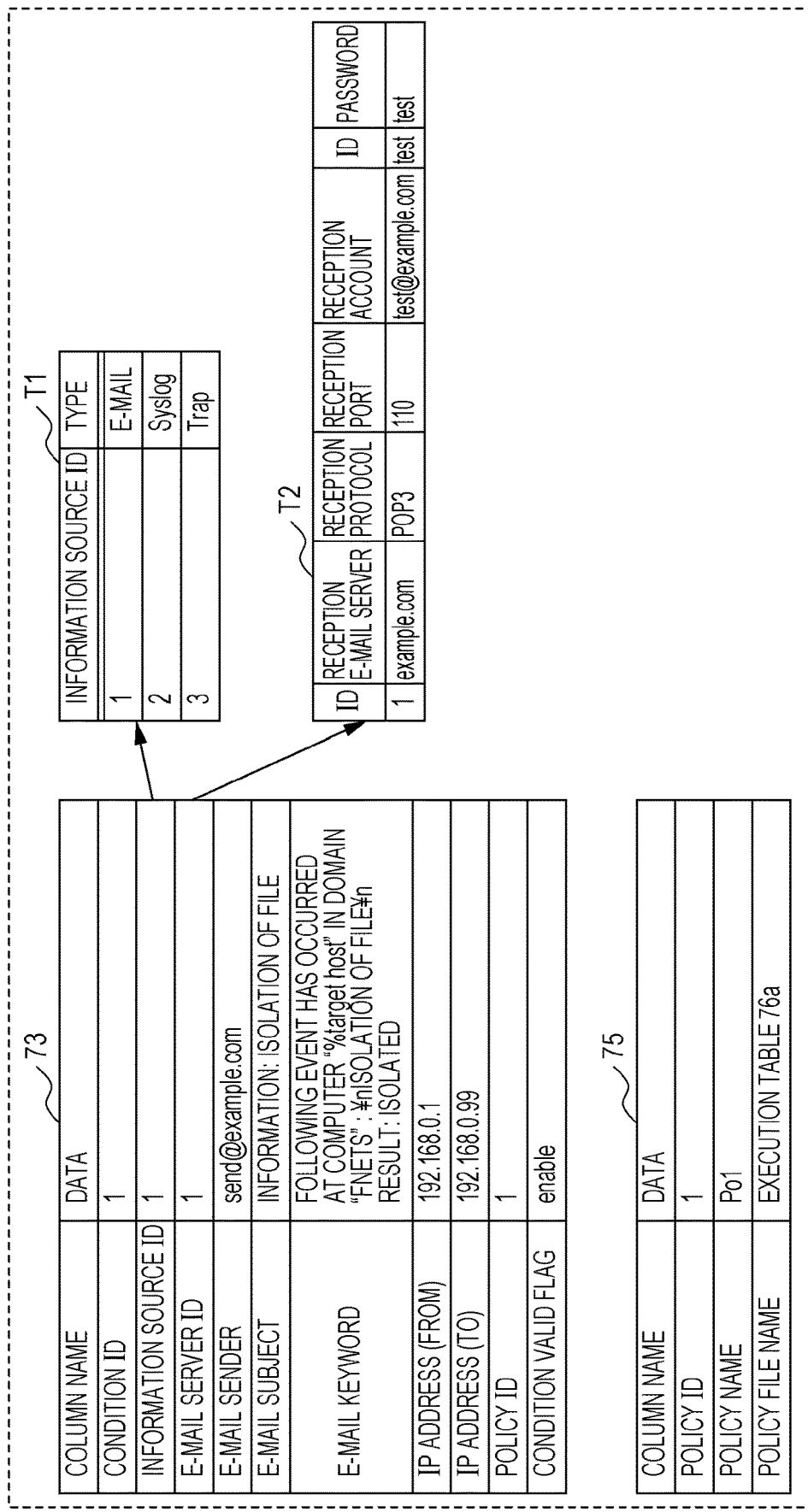
FIG. 19 is a diagram illustrating an example of a condition table and a policy master, according to an embodiment.

FIG. 19 is a diagram illustrating an example of a condition table 73 and a policy master 75. The condition table 73 includes a condition ID, an information source ID, an e-mail server ID, an e-mail sender, an e-mail subject, an e-mail keyword, an IP address, a policy ID, and a condition valid flag.

The condition ID is identification information which is set for each condition. The information source ID is used for specifying a type of an information source used for notifying detection of unauthorized communication. In an example of FIG. 19, any of values of 1 to 3 is set as a value of the information source ID as illustrated in a table T1. The information source ID=1 represents that information of detection of unauthorized communication is notified to the control apparatus 70 by e-mail. Similarly, the information source ID=2 represents that information of detection of unauthorized communication is notified to the control apparatus 70 by Syslog, and the information source ID=3 represents that information of detection of unauthorized communication is notified to the control apparatus 70 by Trap. The e-mail server ID is identification information identifying an e-mail server which becomes a notification source in a case where information of detection of unauthorized communication is notified to the control apparatus 70. In a table T2, detailed information of each e-mail server is recorded in association with the e-mail server ID. In the table T2, a server name of a reception e-mail server, a reception protocol, a reception port, a reception account, an ID, and a password are recorded in association with the e-mail server ID. The server name of the reception e-mail server is sample.com, the reception protocol is the post office protocol version 3 (POP3), and the reception port number is 110. The reception account is test@example.com, an ID used when the e-mail is received is test, and a password used when the e-mail is received is test. The e-mail sender is an e-mail address used by the e-mail server which becomes a notification source in a case where information of detection of unauthorized communication is notified to the control apparatus 70 by e-mail, and is send@example.com in an example of FIG. 19.

The e-mail subject is information included in a subject of an e-mail notifying detection of unauthorized communication and being sent from the detection server 8 to the control apparatus 70. The e-mail keyword is information included in a main text of the e-mail notified to the control apparatus 70 by the detection server 8, and is a fixed form sentence used for notifying contents of processing that have been performed on a file including malware by the detection server 8, a file used in unauthorized communication by the detection server, or the like. In an example of FIG. 19, the e-mail subject is "information: isolation of file". The e-mail keyword is a character string of "Following event has occurred at computer "% target host" in domain "fnets": ¥n isolation of file ¥n result: isolated", where it is assumed that "¥n" represents line feeding. The "% target_host" within the e-mail keyword is a variable parameter and an IP address allocated to the communication terminal 10 for which unauthorized communication is detected is set to the "% target_host". That is, a combination of the e-mail subject and the e-mail keyword corresponds to information included in the e-mail template MT1 or the like of the first embodiment.

In the condition table 73 illustrated in FIG. 19, a range of IP addresses to which the condition is to be applied is set. Accordingly, among entries within the condition table 73 stored in the control apparatus 70, information of the entry coincident with all conditions including the range of the IP addresses is used for subsequent processing. In an example of the condition table 73, in a case where the e-mail subject and the e-mail keyword are coincident and an IP address allocated to the communication terminal 10 which is a target to be isolated is included in a range from 192.168.0.1 to 192.168.0.99, a condition of condition ID=1 is applied. The policy ID is a value used for classifying the execution tables 76 by the policy master 75 and uniquely identifying the execution table 76. In the example of FIG. 19, policy ID=1. The condition valid flag is a flag indicating that a set condition is valid. In a case where condition valid flag=enable, the condition valid flag represents that the system is set as a state where the set condition is usable. On the other hand, in a case where condition valid flag=disable, the condition valid flag represents that the system is not set as a state where the set condition is usable. Accordingly, the condition which is set as condition valid flag=disable is not used for processing by the control apparatus 70.

When a notification e-mail is acquired from the detection server 8, the analysis unit 31 analyzes the notification e-mail by using the e-mail subject and the e-mail keyword within the condition table 73, to specify the communication terminal 10 which became the target. The analysis unit 31 narrows the conditions with the possibility of being applied to processing for the notification e-mail, within the condition table 73, by using information such as a transmission source of notification e-mail as a key. Furthermore, the analysis unit 31 extracts a condition that the IP address of the communication terminal 10 which became the target is included in the application range of the IP addresses, from the narrowed conditions. In a case where a condition valid flag of the extracted condition is set as enable, the analysis unit 31 retrieves the policy master 75 by using the policy ID within the extracted condition as a key. Here, it is assumed that the analysis unit 31 determines that the condition of policy ID=1 is to be applied.

The policy master 75 includes a policy ID, a policy name, and a policy file name. The policy master 75 stores metadata of each policy by using each execution table 76 as a single policy. The policy name is a name of a policy specified by the policy ID, and the policy file name is identification information of the execution table 76 corresponding to a policy specified by the policy ID. In the example of FIG. 19, a policy name of a policy having policy ID=1 is Po1, and a policy file name is the execution table 76a.

It is assumed that the analysis unit 31 retrieves the condition table 73 within FIG. 19 by using policy ID=1 as a key. Then, the analysis unit 31 recognizes that the execution table 76a may be used for applying policy ID=1. The analysis unit 31 requests the processing determination unit 32 to use the execution table 76a.

FIG. 20 is a diagram illustrating an example of an execution table 76a and an apparatus table 53a. In the execution table 76a, a transfer apparatus which becomes a control target when a policy, which is set in the execution table 76a, is executed and processing for each transfer apparatus are included as a processing target list. In the processing target list, information such as information on a processing target device, a setting config, or an execution order is included. In a field of processing target device within the execution table 76a, identification information of the apparatus table 53 having stored information of an apparatus which becomes the processing target is designated. In the following description, it is assumed that an apparatus whose information is recorded in the apparatus table 53a is selected as a control target. The setting config is information specifying the command information 55 used for setting the processing target. In the example of FIG. 20, the setting config is the command information 55a. The execution order represents an execution order in a case where information of a plurality of apparatuses is registered in the processing target list. In the example of FIG. 20, information indicating that setting by the command using the command information 55a is to be performed first (execution order=1) is registered in the apparatus specified in the apparatus table 53a.

The processing determination unit 32 outputs the information obtained from the execution table 76a to the command generation unit 40. Then, the command generation unit 40 starts generation of a command by using a file name of the apparatus table 53a notified from the processing determination unit 32 and the command information 55a.

In the apparatus table 53a, in addition to a device type, a communication type, a connection destination IP address, and a connection destination uniform resource locator (URL), information usable for each execution authority when connecting to the apparatus whose information is registered in the apparatus table 53a is included. In the apparatus table 53a, a waiting user name, a user name, password waiting, and a password is used for an access by authority as a general user (User) to whom setting change is not allowed. In the example of the apparatus table 53a, in the case of access being performed by User authority, when information of "Login:" is transmitted from the processing target apparatus to the control apparatus 70, the command generation unit 40 of the control apparatus 70 outputs a user name of "admin". Similarly, in the case of access being performed by User authority, when information of "Password:" is transmitted from the processing target apparatus to the control apparatus 70, the command generation unit 40 of the control apparatus 70 outputs data of "fnets".

A management mode command, managing user name waiting, a managing user name, management password waiting, a management password, and a management mode end command are used when access is performed by a user (Enable) whose authority is greater than the User. When the managing user name waiting is notified from the processing target apparatus, the control apparatus 70 outputs the managing user name in order to access the apparatus. Similarly, when the management password waiting is notified from the processing target apparatus, the control apparatus 70 outputs the management password in order to access the apparatus. The management mode command is used when accessing by authority as Enable is performed, and the management mode end command is used when accessing by authority as Enable is ended.

A config mode command, config user name waiting, a config user name, config password waiting, a config password, a config mode end command, and a setting save command are used when access by authority as Config is performed, where "Config" is a user to whom change of setting is allowed. When the config user name waiting is notified from the processing target apparatus, the control apparatus 70 outputs the config User name in order to access the apparatus. Similarly, when the config password waiting is notified from the processing target apparatus, the control apparatus 70 outputs the config password in order to access the apparatus. The config mode command is used when accessing by authority as Config is performed, and the setting save command is used when set contents are saved. The config mode end command is used when accessing by authority as Config is ended.

Although data is registered regarding items, among items within the apparatus table 53, which are correlated with information that is used for the control apparatus 70 to access an apparatus whose information is stored in the apparatus table 53, not all data may be registered. For example, regarding the transfer apparatus that the control apparatus 70 does not perform accessing by authority as Enable, information used when accessing by Enable authority is performed may not be registered in the apparatus table 53.

FIG. 21 is a diagram illustrating an example of command information 55a. The command information 55a includes a command list. In the command list, an execution order of command, an execution authority, an execution command, and a type are recorded in association with information of a device of an application destination of command. In an example of FIG. 21, a command CO1 is executed, with execution authority as Config, firstly in the order of executing commands. When accessing by authority as Config is performed, information associated with Config in the apparatus table 53a (FIG. 20) is appropriately used. A type of the command CO1 is BASE. It is assumed that BASE and ACTION are present as the type of command. The command which is set as command type=BASE is a command used when unauthorized communication is not detected. On the other hand, the command which is set as command type=ACTION is a command used to cause control to be performed when unauthorized communication is notified.

Although an example in which a single command is registered in the command information 55a within FIG. 21 is illustrated for lack of space, when the commands are listed in a command execution order, a list of commands illustrated in, for example, a list L1 or a list L2 are obtained.

The command generation unit 40 generates a control packet for notifying the obtained command list, and transmits the control packet to the processing target apparatus via the transmission unit 23. Accordingly, the transfer apparatus of the processing target apparatus may execute a command designated in the control packet to isolate a communication terminal 10 of the processing target in a manner similar to the first embodiment.

FIG. 22 is a diagram illustrating an example of a notification destination table 54 and an isolation status table 56. The processing determination unit 32 determines whether isolation is to be performed on the communication terminal 10 which became a target, by using the execution table 76. When it is determined that isolation is to be performed, the processing determination unit 32 records information of the communication terminal 10 of the target in the isolation status table 56. Although only the IP address of the communication terminal 10 which became a target is detected by the analysis unit 31 in the description made with reference to the first embodiment, FIG. 19, or the like, a host name of the communication terminal 10 which became a target may also be notified to the control apparatus 70 or the like according to installation. In this case, the analysis unit 31 may also extract the host name together with the IP address of the communication terminal 10 which became a target depending on settings of the e-mail template or the like.

The isolation status table 56 includes an isolation ID, a host name, an IP address, a detection data and time, a policy ID, or the like. The isolation ID is an entry number for information of the isolated communication terminal 10. The host name is a host name which is set in the isolated communication terminal 10. The IP address is an IP address which is set in the isolated communication terminal 10. The detection data and time indicates the time at which unauthorized communication is detected in the isolated communication terminal 10.

In an example of FIG. 22, information is recorded which indicates that the communication terminal 10, for which isolation ID=1, a host name is okamura-pc, and an address of 192.168.0.1 is allocated, is isolated. The communication terminal 10 having a host name of okamura-pc is isolated using a policy (execution table 76a) identified by policy ID=1 due to an attack detected at eleven twenty-nine on Jan. 29, 2016.

It is assumed that information indicating that the isolation status table 56 is updated is notified to the notification processing unit 33 from the processing determination unit 32. Then, the notification processing unit 33 references the isolation status table 56 to specify information of the communication terminal 10 which became a target. Then, the notification processing unit 33 transmits an e-mail notifying processing contents to a notification destination by using information of the notification destination table 54.

In the notification destination table 54, a notification destination ID, a notification destination name, and a notification destination e-mail address are included. The notification destination ID is an entry number for each notification destination. The notification destination name is a host name of the notification destination to which a processing result by the control apparatus 70 is transmitted. The notification destination e-mail address is an e-mail address of the notification destination to which a processing result by the control apparatus 70 is transmitted. In an example of FIG. 22, for notification destination ID=1, a notification is sent to an apparatus having a host name of a quarantine detection notification destination. An e-mail address of info@exsample.com is used in the apparatus having the host name of the quarantine detection notification destination.

Accordingly, in the example of FIG. 22, e-mail notifying that the communication terminal 10 whose host name is okamura-pc and to which an address of 192.168.0.1 is allocated is isolated is transmitted to info@exsample.com of a destination. Thus, contents of the processing performed by the control apparatus 70 are specified in the apparatus having the host name of the quarantine detection notification destination.

Figure 23:
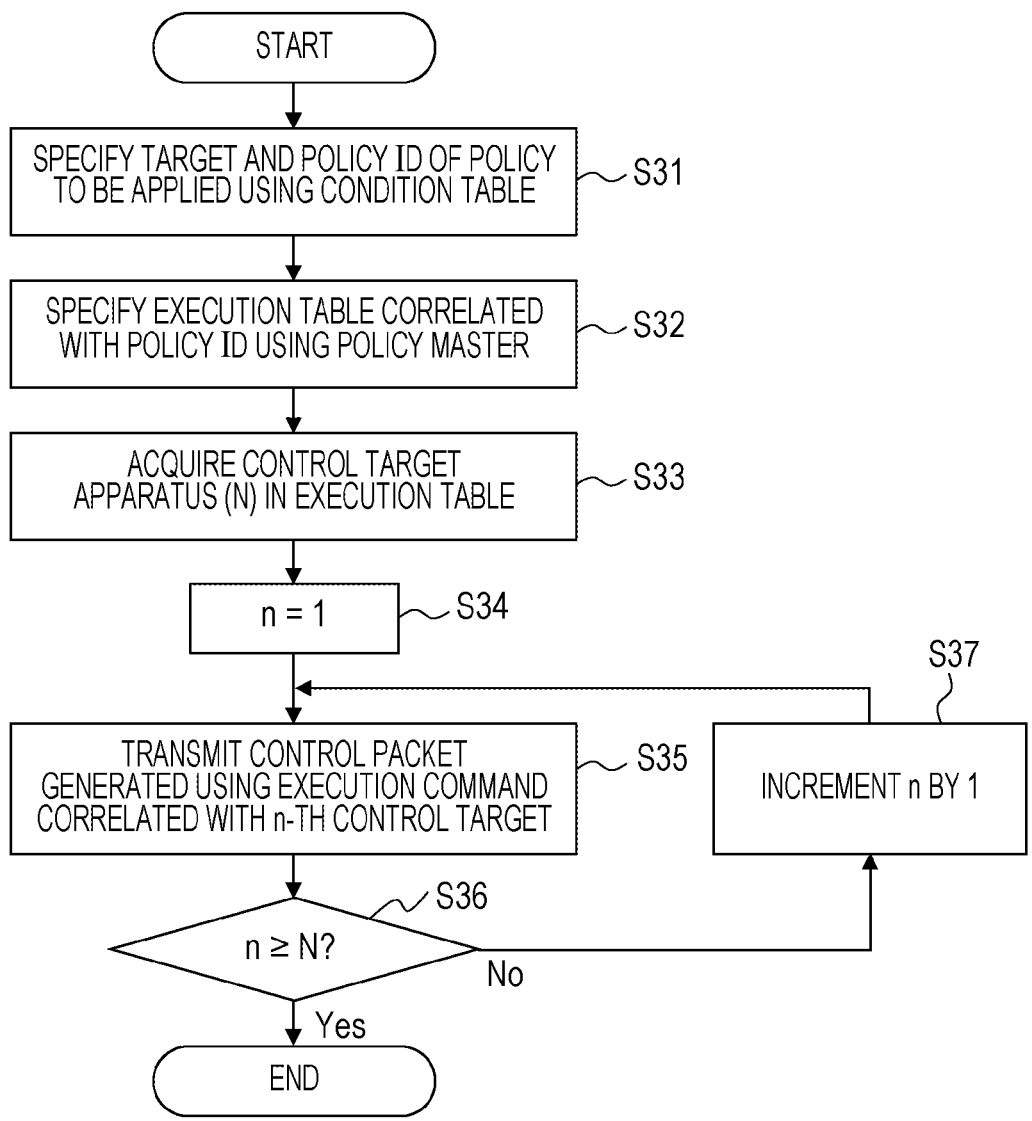
FIG. 23 is a diagram illustrating an example of an operational flowchart for processing, according to an embodiment.

FIG. 23 is an operational flowchart illustrating an example of processing performed in the third embodiment. In FIG. 23, the fixed number N is a total number of apparatuses which become a control target for isolating the communication terminal 10 which becomes a target of control and the variable n is used for counting the number of apparatuses for which control is performed.

The analysis unit 31 of the control apparatus 70 specifies a target which is the communication terminal 10 for which the unauthorized communication notified from the detection server 8 is detected and a policy ID of a policy to be applied, by using the condition table 73 (Step S31). The analysis unit 31 specifies the execution table 76 correlated with the policy ID by using the policy master 75 (Step S32). The processing determination unit 32 acquires the total number N of apparatuses of a control target within the execution table 76 which becomes a target to be applied (Step S33). The command generation unit 40 sets 1 to variable n (Step S34). The command generation unit 40 reads an execution command correlated with an n-th control target to generate a control packet, and the transmission unit 23 transmits the generated control packet to a destination (Step S35). Thereafter, the command generation unit 40 determines whether the variable n is greater than or equal to the fixed number N (Step S36). In a case where the variable n is less than the fixed number N, the command generation unit 40 increments the variable n by one and the processing returns to Step S35 (No in Step S36 and Step S37). Otherwise, in a case where the variable n is greater than or equal to the fixed number N, the command generation unit 40 determines that the command has been transmitted to all of the apparatuses of the control target, and the processing is ended (Yes in Step S36).

Although a case where isolation is performed on the communication terminal 10 is described as an example in the description of FIG. 18 to FIG. 23, in a manner similar to the first embodiment or the like, the processing performed on the communication terminal 10 which became an attacking target may be changed as desired according to installation.

Others

Also, in the third embodiment, the control apparatus 70 may perform releasing of isolation or the like according to procedural sequences similar to the second embodiment. Setting of an operation method or the like using the wild card master may also be changed according to installation.

In the third embodiment, although an example of change of a setting method of information such as a table used for setting is described, the setting method of information may be changed as desired according to installation. For example, in the execution table 61 illustrated in FIG. 6 or the like, although the apparatus of the control target and the command executed for each apparatus are registered in association with each other, the execution table 61 may be divided into a plurality of tables.

FIG. 24 is a diagram illustrating a modification example of information stored by the control apparatus 20 or the control apparatus 70. FIG. 24 illustrates an example of a case where information within the execution table 61 and information of the type of unauthorized communication within the condition table 51 are maintained by being divided into tables T11 to T13.

In the table T11, for each of communication terminals 10 within the system, a list of transfer apparatuses, which become a control target when unauthorized communication targeted at the communication terminal 10 is detected, is recorded. The table T11 illustrates an example in which the list of transfer apparatuses is stored in association with the IP address of the communication terminal 10 in order to make it easy to specify the transfer apparatus based on the contents notified from the detection server 8. For example, in a case where unauthorized communication targeted 192.168.1.1 (communication terminal 10c) is detected, an apparatus (switch 3d) having IP address=10.0.0.1 and an apparatus (switch 3e) having IP address=10.0.0.2 become a control target.

In the table T12, a type of unauthorized communication is associated with a type of control to be performed. For example, according to the table T12, in a case where information indicating that virus infection is detected is notified, control for isolating the communication terminal 10 being regarded as the target is performed. On the other hand, in a case where information indicating that backdoor communication is detected is notified, control for restricting a transfer speed of a packet including the IP address of the communication terminal 10 being regarded as a target to a value less than or equal to a threshold value is performed. In then example of the table T12, although a case where control according to the type of unauthorized communication is uniquely specified is illustrated as an example, even when the same type of unauthorized communication is notified, contents of control may be set to be changed according to an address of target or the like.

In a table T13, a transfer apparatus of a control target is associated with a control command (command group) used according to a type of control. For example, in a case where an apparatus (switch 3d) having IP address=10.0.0.1 is controlled for isolating a target, the command group CG1 (FIG. 7) is used and in a case where the apparatus is controlled for releasing isolation of the target, the command group CG11 (FIG. 14) is used. Similarly, in a case where an apparatus (switch 3e) having IP address=10.0.0.2 is controlled for isolating a target, the command group CG2 (FIG. 7) is used. In a case where the apparatus (switch 3d) having IP address=10.0.0.1 is controlled in order to restrict a transfer speed of a packet including the IP address of the communication terminal 10 being regarded as a target to a value less than or equal to a threshold value, a command group CG15 is used. In an example of the table T13, although processing for releasing isolation or the like as well as isolation of the target is also included as the type of control, information on the processing for releasing isolation or the like may be stored in a table different from the table T13.

In a case where a table is generated as illustrated in FIG. 24, when the communication terminal 10 being regarded as a target and the type of unauthorized communication are specified using the notification from the detection server 8, the analysis unit 31 notifies specified information to the processing determination unit 32. The processing determination unit 32 determines a transfer apparatus to be regarded as a control target by referencing the table T11, and retrieves the table T12 by using the type of unauthorized communication as a key to thereby specify control contents. The processing determination unit 32 notifies a combination of the transfer apparatus which becomes the control target and the control contents to the command generation unit 40. Then, for each of transfer apparatuses being regarded as the control target, the command generation unit 40 generates a control command corresponding to the control contents determined by the processing determination unit 32 by using the table T13 and the command information 55. When a control packet including the generated control command is generated, the command generation unit 40 transmits the control packet to the transfer apparatus of the control target via the transmission unit 23.

On the other hand, in a case where the control apparatus 20 receives a request for release of isolation or the like, the processing determination unit 32 may retrieve the table T11 by using an address of the communication terminal 10 which becomes a target of release as a key to thereby specify the transfer apparatus of the control target. Then, the processing determination unit 32 outputs information indicating that release of isolation is requested and information of the transfer apparatus of the control target to the command generation unit 40. The command generation unit 40 may retrieve the table T13 by using information acquired from the processing determination unit 32 to thereby specify a command group used for releasing isolation of the communication terminal 10 being regarded as the target. Accordingly, the command generation unit 40 may generate a control packet by using the specified command and transmit the control packet to the transfer apparatus of the control target via the transmission unit 23.

Also, in a system using the control apparatus 20 or the control apparatus 70 which uses data modified as illustrated in FIG. 24, processing after detection of unauthorized communication becomes easy in a manner similar to the first to third embodiments.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A non-transitory, computer-readable recording medium having stored therein a program for causing a computer included in a control apparatus to execute a process, the control apparatus being configured to control transfer apparatuses that transfer a packet transmitted and received by a plurality of communication terminals in a communication network, the process comprising:

providing first information, second information, third information, a first template, a second template, and a third template, the first information being configured to store, for each of the plurality of communication terminals, identification information identifying at least one of the transfer apparatuses via which a packet is transmitted from or to at least one of the plurality of communication terminals, the second information being configured to store a type of unauthorized communication in association with a type of control to be performed for the type of unauthorized communication, the third information being configured to store, for each of the transfer apparatuses, the type of control and a control command to be applied to the transfer apparatus according to the type of control, the first template specifying an area used for notifying the type of the unauthorized communication and the communication terminal from a character string included in a notification e-mail, the second template specifying an area used for notifying the type of the unauthorized communication and the communication terminal from history information, and the third template specifying an area used for notifying the type of the unauthorized communication and the communication terminal from control information;

receiving detection information notified from a detection server that detects an unauthorized communication of a first communication terminal by using packets transferred via the transfer apparatuses, the detection information being one of the notification e-mail that notifies information on the communication terminal and the type of the unauthorized communication, the history information indicating a history of communication performed by the communication terminal, and the control information that notifies information on the communication terminal and the type of the unauthorized communication;

upon receiving the notification e-mail, extracting, from the received notification e-mail, the type of the unauthorized communication and information on the communication terminal by using the first template;

upon receiving the history information, extracting, from the received history information, the type of the unauthorized communication and information on the communication terminal by using the second template;

upon receiving the control information, extracting, from the received control information, the type of the unauthorized communication and information on the communication terminal by using the third template;

identifying the first communication terminal and the type of the unauthorized communication, based on the detection information;

determining at least one transfer apparatus to be controlled, by referencing the first information that stores information identifying the at least one transfer apparatus in association with the first communication terminal;

determining the type of control to be performed on the at least one transfer apparatus by referencing the second information that stores the type of control in association with the type of the unauthorized communication; and reading a first control command corresponding to the type of control and the at least one transfer apparatus, from the third information that stores the type of control and the first control command to be applied to the at least one transfer apparatus according to the type of control, and transmitting a control packet including the first control command to the at least one transfer apparatus to cause the at least one transfer apparatus to execute the first control command according to the type of control.

2. The non-transitory, computer-readable recording medium of claim 1, the process further comprising:

upon receiving a release request for requesting release of the control for the first communication terminal, generating a second control command that is to be applied to each of the at least one transfer apparatus when the control is released, by referencing the third information, and transmitting a control packet including the second control command to each of the at least one transfer apparatus.

3. The non-transitory, computer-readable recording medium of claim 1, the process further comprising:
providing, as the first information and the second information, an execution table that specifies information to be referenced by the program, wherein
the execution table stores, in association with a combination of a communication terminal in the plurality of communication terminals and the type of the unauthorized communication, information on the at least one transfer apparatus that is to be controlled when the combination is notified from the detection server, and information on the control to be performed on the at least one transfer apparatus.

4. An apparatus to control transfer apparatuses that transfer packets transmitted and received by a plurality of communication terminals in a communication network, the apparatus comprising:
a memory configured to store first information, second information, third information, a first template, a second template, and a third template, the first information being configured to store, for each of the plurality of communication terminals, identification information identifying at least one of the transfer apparatuses via which a packet is transmitted from or to at least one of the plurality of communication terminals, the second information being configured to store a type of unauthorized communication in association with a type of control to be performed for the type of unauthorized communication, the third information being configured to store, for each of the transfer apparatuses, the type of control and a control command to be applied to the transfer apparatus according to the type of control, the first template specifying an area used for notifying the type of the unauthorized communication and the communication terminal from a character string included in a notification e-mail, the second template specifying an area used for notifying the type of the unauthorized communication and the communication terminal from history information, and the third template specifying an area used for notifying the type of the unauthorized communication and the communication terminal from control information; and
a processor coupled to the memory and configured to:
receive detection information notified from a detection server that detects unauthorized communication of a first communication terminal by using packets transferred via the transfer apparatuses, the detection information being one of the notification e-mail that notifies information on the communication terminal and the type of the unauthorized communication, the history information indicating a history of communication performed by the communication terminal, and the control information that notifies information on the communication terminal and the type of the unauthorized communication,
upon receiving the notification e-mail, extract, from the received notification e-mail, the type of the unauthorized communication and information on the communication terminal by using the first template,
upon receiving the history information, extract, from the received history information, the type of the unauthorized communication and information on the communication terminal by using the second template,
upon receiving the control information, extract, from the received control information, the type of the unauthorized communication and information on the communication terminal by using the third template,
identify the first communication terminal and the type of the unauthorized communication, based on the detection information,
determine at least one transfer apparatus to be controlled, by referencing the first information that stores information identifying the at least one transfer apparatus in association with the first communication terminal,
determine the type of control to be performed on the at least one transfer apparatus by referencing the second information that stores the type of control in association with the type of the unauthorized communication, and
read a first control command corresponding to the type of control and the at least one transfer apparatus, from the third information that stores the type of control and the first control command to be applied to the at least one transfer apparatus according to the type of control, and transmit a control packet including the first control command to the at least one transfer apparatus to cause the at least one transfer apparatus to execute the first control command according to the type of control.

5. The apparatus of claim 4, wherein
the processor is further configured to, upon receiving a release request for requesting release of the control for the first communication terminal, generate a second control command that is to be applied to each of the at least one transfer apparatus when the control is released, by referencing the third information, and transmit a control packet including the second control command to each of the at least one transfer apparatus.

6. The apparatus of claim 4, wherein
the memory is further configured to include, as the first information and the second information, an execution table that specifies information to be referenced by the processor; and
the execution table stores, in association with a combination of a communication terminal in the plurality of communication terminals and the type of the unauthorized communication, information on the at least one transfer apparatus that is to be controlled when the combination is notified from the detection server, and information on the control to be performed on the at least one transfer apparatus.

7. A method performed by a control apparatus configured to control transfer apparatuses that transfer packets transmitted and received by a plurality of communication terminals in a communication network, the method comprising:
providing first information, second information, third information, a first template, a second template, and a third template, the first information being configured to store, for each of the plurality of communication terminals, identification information identifying at least one of the transfer apparatuses via which a packet is transmitted from or to at least one of the plurality of communication terminals, the second information being configured to store a type of unauthorized communication in association with a type of control to be performed for the type of unauthorized communication, the third information being configured to store, for each of the transfer apparatuses, the type of control and a control command to be applied to the transfer apparatus according to the type of control, the first template specifying an area used for notifying the type of the unauthorized communication and the communication terminal from a character string included in a notification e-mail, the second template specifying an area used for notifying the type of the unauthorized communication and the communication terminal from history information, and the third template specifying an area used for notifying the type of the unauthorized communication and the communication terminal from control information;

receiving detection information notified from a detection server that detects unauthorized communication of a first communication terminal by using packets transferred via the transfer apparatuses, the detection information being one of the notification e-mail that notifies information on the communication terminal and the type of the unauthorized communication, the history information indicating a history of communication performed by the communication terminal, and the control information that notifies information on the communication terminal and the type of the unauthorized communication, upon receiving the notification e-mail, extracting, from the received notification e-mail, the type of the unauthorized communication and information on the communication terminal by using the first template, upon receiving the history information, extracting, from the received history information, the type of the unauthorized communication and information on the communication terminal by using the second template, upon receiving the control information, extracting, from the received control information, the type of the unauthorized communication and information on the communication terminal by using the third template;

identifying the first communication terminal and the type of the unauthorized communication, based on the detection information;

determining at least one transfer apparatuses to be controlled, by referencing the first information that stores information identifying at least one transfer apparatus in association with the first communication terminal;

determining the type of control to be performed on the at least one transfer apparatus by referencing the second information that stores the type of control in association with the type of the unauthorized communication; and reading a first control command corresponding to the type of control and the at least one transfer apparatus, from the third information that stores the type of control and the first control command to be applied to the at least one transfer apparatus according to the type of control, and transmitting a control packet including the first control command to the at least one transfer apparatus to cause the at least one transfer apparatus to execute the first control command according to the type of control.

8. The method of claim 7, further comprising:

upon receiving a release request for requesting release of the control for the first communication terminal, generating a second control command that is to be applied to each of the at least one transfer apparatus when the control is released, by referencing the third information, and transmitting a control packet including the second control command to each of the at least one transfer apparatus.

* * * * *